(12) United States Patent
Yoshida et al.

(10) Patent No.: US 7,060,384 B2
(45) Date of Patent: Jun. 13, 2006

(54) POLYMER ELECTROLYTE FUEL CELL

(75) Inventors: Akihiko Yoshida, Hirakata (JP); Masao Yamamoto, Kishiwada (JP); Junji Niikura, Hirakata (JP); Yasuo Takebe, Uji (JP); Osamu Sakai, Neyagawa (JP); Makoto Uchida, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 449 days.

(21) Appl. No.: 10/253,513

(22) Filed: Sep. 25, 2002

(65) Prior Publication Data

US 2003/0064279 A1 Apr. 3, 2003

(30) Foreign Application Priority Data

Sep. 28, 2001 (JP) .............................. 2001-301730
Sep. 28, 2001 (JP) .............................. 2001-301734

(51) Int. Cl.
*H01M 4/86* (2006.01)
*H01M 4/90* (2006.01)
*H01M 4/96* (2006.01)

(52) U.S. Cl. ........................... 429/42; 429/40; 429/38; 429/39

(58) Field of Classification Search .................. 429/42, 429/40, 34
See application file for complete search history.

(56) References Cited

U.S. PATENT DOCUMENTS

| 4,444,852 A | * | 4/1984 | Liu et al. ....................... 429/29 |
| 5,500,292 A | * | 3/1996 | Muranaka et al. ............ 429/209 |
| 5,561,000 A | * | 10/1996 | Dirven et al. .................. 429/42 |
| 5,620,807 A | * | 4/1997 | Mussell et al. ................ 429/33 |

FOREIGN PATENT DOCUMENTS

| CN | 1180249 A | 4/1988 |
| CN | 1114785 A | 1/1996 |
| JP | 2000-058073 A | 2/2000 |

\* cited by examiner

*Primary Examiner*—Patrick Joseph Ryan
*Assistant Examiner*—Julian Mercado
(74) *Attorney, Agent, or Firm*—McDermott Will & Emery LLP

(57) ABSTRACT

A porous supporting carbon body of a gas diffusion layer is provided with a larger number of smaller pores at its catalyst layer side and a smaller number of larger pores at the other side, particularly with an appropriate distribution of finer mesh at its catalyst layer side and coarser mesh at the other side. As a result, a high performance polymer electrolyte fuel cell is obtained in which water generated at the catalyst layer is quickly sucked out to the gas diffusion layer, and is evaporated at the gas diffusion layer to be effectively exhausted to outside the fuel cell, so that excessive water can be prevented from retaining in the gas diffusion electrode, with the polymer electrolyte membrane being maintained at an appropriately wet condition.

10 Claims, 10 Drawing Sheets

POLYMER ELECTROLYTE FUEL CELL

BACKGROUND OF THE INVENTION

The present invention relates to a polymer electrolyte fuel cell to be used for co-generation systems and mobile electric power generators for e.g. automobiles or the like, particularly to a gas diffusion layer to be used for such fuel cells.

In a polymer electrolyte fuel cell, a fuel gas such as hydrogen and an oxidant gas such as air are supplied to a pair of gas diffusion electrodes (anode for the fuel gas and cathode for the oxidant gas), and are electrochemically reacted with each other at catalyst layers of e.g. platinum therein. Such reaction generates electricity and heat at the same time. A general structure of such polymer electrolyte fuel cell is shown in FIG. 1.

Referring to FIG. 1, opposite main surfaces of a polymer electrolyte membrane 11 for selective transporting hydrogen ions are provided with a pair of catalyst layers 12 to intimately contact the membrane respectively. Each catalyst layer 12 has a carbon powder as a main component and carrying platinum metal catalyst. Outside the respective catalyst layers 12 are provided a pair of gas diffusion layers to intimately contact the catalyst layers 12, wherein each gas diffusion layer 13 comprises a porous supporting carbon body, made of porous carbon material and supporting e.g. the catalyst layer. A combination of each gas diffusion layer 13 and each catalyst layer 12 constitutes a gas diffusion electrode 14.

A pair of separator plates 17 are provided outside the pair of gas diffusion electrodes 14: which mechanically fix a polymer electrolyte membrane-electrode assembly (MEA hereafter) 15 constituted by the gas diffusion electrodes 14 and the polymer electrolyte membrane 11; which electrically connect neighboring MEAs in series; and which have gas flow channels 16 at the surfaces thereof contacting gas diffusion electrodes for supplying the reactive gases to the gas diffusion electrodes, and for exhausting, to outside, water generated by the electrochemical reaction and excessive gases. The gas flow channels can be provided separately from the separator plates 17, but it is a general manner to provide grooves, as gas flow channels, on the surfaces of the separator plates. Further, gaskets 18 are provided and sandwiched between the polymer electrolyte membrane 11 and the separator plates 17 for preventing the reactive gases from leaking to outside.

During the operation of the fuel cell, the air or oxygen, which is an active reactive material, is diffused at the cathode side to the catalyst layer from the gas flow channels through the gas diffusion layer. At the same time, excessive water, together with excessive gases, generated by the electrochemical reaction and permeated to the gas diffusion layer from the catalyst layer on the basis of the osmotic effect is exhausted to outside of the fuel cell through pores of the gas diffusion layers.

The polymer electrolyte used in a polymer electrolyte fuel cell can maintain a necessary level of ionic or protonic conductivity when the electrolyte is put under a sufficiently wet condition. So generally, the reactive gases are preliminarily humidified to a given humidity, thereby to secure the humidity of the polymer electrolyte membrane as well as the supply of the reactive gases.

On the other hand, the electrode reaction in a cell is a water generation reaction caused by the three-phase interfaces of the catalyst, the polymer electrolyte and the reactive gases. Accordingly, if the supplied water vapor and the water generated by the electrode reaction are not quickly exhausted to outside, the gas diffusion electrodes or the gas diffusion layers suffer from water undesirably retained therein and get worse in the gas diffusion property, whereby the cell characteristics gets deteriorated.

In view of the foregoing, several countermeasures were taken for improving both the water retaining property and the water exhaustion property of the gas diffusion electrodes to be used for polymer electrolyte fuel cells. A general gas diffusion electrode uses a porous supporting carbon body, to be a gas diffusion layer, having formed thereon a layer of carbon powder, i.e. carbon particles, carrying a noble metal as a catalyst layer. Usually, one carbon material selected from carbon cloths and carbon unwoven fabrics such as carbon paper is used for a porous supporting carbon body. Generally, such porous supporting body is preliminarily subjected to a water repellent treatment by using e.g. a liquid dispersion of polytetrafluoroethylene (PTFE hereafter) material, which is a fluorocarbon material, so as to enable quick exhaustion of water generated during the electrode reaction, and to maintain the polymer electrolyte membrane and the polymer electrolyte in the gas diffusion electrode at an appropriate wet condition. Another countermeasure taken is to mix carbon particles, having been subjected to water repellent treatment, with the electrode catalyst layers, thereby to more readily exhaust excessive generated water in the electrode catalyst layers.

However, such conventional countermeasures are not enough. It is difficult according thereto, with respect to the whole region of each gas diffusion layer from an inlet side to an outlet side of each gas flow channel, to realize [I] a good balance between water retention and water exhaustion in the thickness direction of each gas diffusion layer, i.e. direction perpendicular to the plane of the gas flow channels or of the surface of the gas diffusion layer; and [II] a uniform water retention at gas diffusion layer from the inlet side to the outlet side of each gas flow channel.

Problems according to such prior art will be described below in more detail.

[I] Water Exhaustion and Water Retention in Thickness Direction of Gas Diffusion Layer In a conventional polymer electrolyte fuel cell, a porous supporting carbon body, for a gas diffusion layer, is used for a gas diffusion electrode as described above. For such porous supporting carbon body, a carbon cloth or a carbon unwoven fabric such as a carbon paper is used. Generally, a carbon unwoven fabric has an isotropic gas permeability, whereas a carbon cloth has a higher gas permeability in its thickness direction than in its surface plane direction, because the carbon cloth, which is made of a mesh, has pores defined by the mesh. For this reason, a carbon cloth is generally superior to a carbon unwoven fabric in the function of exhausting excessive water generated at the catalyst layer electrically conductive, whereas the carbon unwoven fabric is superior to the carbon cloth in the function of retaining water therein.

Thus, the water exhaustion property and the water retention property in a gas diffusion layer are in a trade-off relation, i.e. incompatible, with each other. Therefore, it has been attempted to select an optimum material for the porous supporting carbon body from among various materials therefor, depending upon uses, namely upon specific operation conditions.

Therefore, when e.g. discharging currents vary, or when flow rates or amounts of humidification of the supplied gases change, then either amounts of water in the catalyst layers become short, or excessive water blocks the supplied gases from reaching the polymer electrolyte membranes, thereby to deteriorate resultant cell characteristics. Japanese Laid-open Patent Publications Hei 8-124583 and Hei 6-262562 describe a technology to gradually increase coarseness of the mesh of a carbon cloth from an inlet side to an outlet side of the gas flow channel, namely from a finer mesh at the inlet side to a coarser mesh at the outlet side thereof. Such technology cannot solve the problem regarding the water exhaustion property in the thickness direction of the gas diffusion layer.

It is necessary furthermore to allow the supplied gases to sufficiently reach the polymer electrolyte membranes, with the balance between the water exhaustion property and the water retention property being well maintained. In other words, high performance gas diffusion electrodes are needed to be designed in such a manner that water generated at the catalyst layers are quickly sucked out to the gas diffusion layers, and is then evaporated in the gas diffusion layers to be effectively exhausted to outside. Thereby, excessive water is not retained in the electrode catalyst, and the polymer electrolyte is kept at an appropriate wet condition, with the supplied gases sufficiently reaching the polymer electrolyte membrane.

Furthermore, it is difficult and is a factor of cost increase to manufacture a carbon cloth having a mesh varying its fineness or coarseness thereof gradually in the surface plane direction thereof.

[II] Uniform Water Retention at Gas Diffusion Layer from Inlet Side to Outlet Side of Gas Flow Channel A part of water generated by the electrode reaction is flown, together with the reactive gases flowing in the gas flow channels of the separator plates, to the outlet of the gas flow channels, and is exhausted to outside of the fuel cell. Accordingly, the amounts of water contained in the reactive gases so vary in the flow direction of the reactive gases as to cause a larger amount of water at the outlet side than at the inlet side of the reactive gases due to water generated by electrode catalyst reaction or electrochemical reaction. This is likely to cause the amount of water at the outlet side to exceed a given threshold level, thereby to bring the outlet side to an excessively wet condition. For this reason, the fuel cell is likely to have a deteriorated water exhausting function at the outlet side of the gas flow channels. In an extreme case, a serious problem may arise in that the pores of the gas diffusion layers are occluded by the excessive water (flooding or flooding phenomena hereafter), whereby the reactive gases are so inhibited from necessary diffusion as to cause an extreme decrease of the cell voltage.

In contrast to the above, if the reactive gases to be supplied to the inlets of the gas flow are preliminarily so humidified with an amount of humidification as to prevent the flooding phenomena at the outlets thereof, then the water content in the polymer electrolyte membrane at or in the vicinity of the inlets of the gas flow channels is likely to excessively decrease. This causes a problem to decrease the protonic conductivity or increase protonic resistance of the polymer electrolyte membrane there, whereby the cell voltage very much decreases. A fuel cell having gas diffusion electrodes of larger area and gas flow channels of longer length suffers very much more from above described undesired characteristics.

A proposal for solving such problems is described in the Japanese Laid-open Patent Publication Hei 6-167562 as described above. The structure of a fuel cell described in this prior art is to increase the porosity of the gas diffusion layer from the inlet side to the outlet side of each gas flow channel as described also above. However, such prior art structure is likely to have problems of deteriorated basic performances of fuel cells in that the amount of gas diffusion gets non-uniform in the cell surface, and that gas diffusion electrodes get to have decreased electric conductivities at the outlet side of the gas flow channels or to have non-uniform electric conductivities in the cell surface.

BRIEF SUMMARY OF THE INVENTION

The present invention is such one as having been conceived in view of above described problems of prior art, and the object of the present invention is to provide a polymer electrolyte fuel cell having an improved basic performance by realizing a well balanced wet condition of the fuel cell, particularly at the gas diffusion layers with respect to the whole region of the gas diffusion layers from the inlets to the outlets of the gas flow channels.

More specifically, a first object of the present invention is to provide a polymer electrolyte fuel cell, in which [I] a good balance between water retention and water exhaustion in the thickness direction of each gas diffusion layer, i.e. direction perpendicular to the plane of each gas flow channel or of the surface of each gas diffusion layer, is realized.

A second object of the present invention is to provide a polymer electrolyte fuel cell, in which [II] uniform water retention at the gas diffusion layer from an inlet side to an outlet side of each gas flow channel is realized.

[I] Water Exhaustion and Water Retention in Thickness Direction of Gas Diffusion Layer The first object of the present invention is achieved by providing a porous supporting carbon body of a gas diffusion layer with an appropriate distribution of a finer mesh at the catalyst layer side and a coarser mesh at the other side, i.e. a larger number of smaller pores at the catalyst layer side and a smaller number of larger pores at the other side. In providing such an appropriate mesh or pore distribution thereof, the present invention provides two manners.

A polymer electrolyte fuel cell according to a first manner for the first object of the present invention comprises: an ion conductive polymer electrolyte membrane; a pair of gas diffusion electrodes provided to sandwich therebetween the polymer electrolyte membrane, thereby to form a polymer electrolyte membrane-electrode assembly; and a pair of separator plates being provided to sandwich therebetween the polymer electrolyte membrane-electrode assembly at the pair of gas diffusion electrodes, and having gas flow channels to face the pair of gas diffusion electrodes respectively, wherein the pair of gas diffusion electrodes respectively have a pair of catalyst layers to contact the polymer electrolyte membrane, and also have a pair of gas diffusion layers to contact the pair of catalyst layers, wherein each of the gas diffusion layers comprises a porous supporting carbon body, wherein each of the porous supporting carbon bodies comprises at least a first porous carbon layer and a second porous carbon layer, the first porous carbon layer facing corresponding one of the catalyst layers, and wherein the first porous carbon layer has a larger number of smaller pores distributed therein as compared with the second porous carbon layer, the second porous carbon layer thus having a smaller number of larger pores distributed therein as compared with the first porous carbon layer.

Each of the porous supporting carbon bodies is preferred to comprise a carbon cloth.

It is effective that the first and the second porous carbon layers comprises a first carbon cloth and a second carbon cloth, respectively, and that the first carbon cloth has a finer mesh than that of the second carbon cloth.

It is effective that the first and the second porous carbon layers comprise a first layer of wefts and a second layer of wefts, respectively, wherein the first layer of the wefts and the second layer of the wefts are woven by common warps in a manner that the first layer of the wefts has a shorter average inter-weft distance than that of second layer of the wefts.

It is effective that the first carbon cloth and the second carbon cloth are made of first threads and second threads, respectively, wherein the first threads have an average diameter smaller than that of the second threads, thereby to allow the first carbon cloth to have a finer mesh than that of the second carbon cloth.

It is effective that the first porous carbon layer comprises a carbon unwoven fabric, and the second porous layer comprises a carbon cloth.

Each of the pair of gas diffusion layers is preferred to comprise an electrically conductive polymer-containing layer provided on the porous supporting carbon body thereof at the catalyst layer side thereof, wherein the electrically conductive polymer-containing layer comprises a polymer material and electrically conductive carbon particles.

The polymer material of the electrically conductive polymer-containing layer is preferred to contain a fluorocarbon resin.

Each of the porous supporting carbon bodies is preferred to have water repellent property.

A polymer electrolyte fuel cell according to a second manner for the first object of the present invention comprises: an ion conductive polymer electrolyte membrane; a pair of gas diffusion electrodes provided to sandwich therebetween the polymer electrolyte membrane, thereby to form a polymer electrolyte membrane-electrode assembly; and a pair of separator plates being provided to sandwich therebetween the polymer electrolyte membrane-electrode assembly at the pair of gas diffusion electrodes, and having gas flow channels to face the pair of gas diffusion electrodes respectively, wherein the pair of gas diffusion electrodes respectively have a pair of catalyst layers to contact the polymer electrolyte membrane, and also have a pair of gas diffusion layers to contact the pair of catalyst layers, wherein each of the gas diffusion layers comprises a carbon cloth having first mesh portions and second mesh portions, wherein the second mesh portions are coarser than the first mesh portions, and are distributed among the first mesh portions intermittently in a direction of the surface plane thereof.

It is effective that the first mesh portions and the second mesh portions are made of first threads and second threads, respectively, wherein the second threads have an average diameter larger than that of the first threads, and wherein the second mesh portions are distributed among the first mesh portions periodically in a direction of the surface plane thereof.

It is effective that the carbon cloth is made of warps and such wefts that periodically vary the inter-weft distances in a direction of the surface plane of the carbon cloth, thereby to obtain the periodical distribution of the second mesh portions among the first mesh portions.

Each of the pair of gas diffusion layers is preferred to comprise an electrically conductive polymer-containing layer provided on the carbon cloth thereof at the catalyst layer side thereof, wherein the electrically conductive polymer-containing layer comprises a fluorocarbon resin and electrically conductive carbon particles.

Each of the gas diffusion layers is preferred to have water repellent property.

[II] Uniform Water Retention at Gas Diffusion Layer from Inlet Side to Outlet Side of Gas Flow Channel The second object of the present invention is achieved by providing a unique gas diffusion layer in a polymer electrolyte fuel cell comprising: an ion conductive polymer electrolyte membrane; a pair of gas diffusion electrodes provided to sandwich therebetween the polymer electrolyte membrane, thereby to form a polymer electrolyte membrane-electrode assembly; and a pair of separator plates being provided to sandwich therebetween the polymer electrolyte membrane-electrode assembly at the pair of gas diffusion electrodes, and having gas flow channels to face the pair of gas diffusion electrodes respectively, wherein the pair of gas diffusion electrodes respectively have a pair of catalyst layers to contact the polymer electrolyte membrane, and also have a pair of gas diffusion layers to contact the pair of catalyst layers.

A gas diffusion layer according to a first manner for the second object of the present invention comprises: a porous supporting body, preferably a porous supporting carbon body; and an electrically conductive polymer-containing layer provided on the porous supporting body, wherein the electrically conductive polymer-containing layer comprises a polymer and electrically conductive carbon particles which comprise at least a first carbon powder or first carbon particles and a second carbon powder or second carbon particles that have a larger amount of acidic function group than that of the first carbon powder or particles, and wherein the weight ratio of the second carbon powder or particles, relative to the first carbon powder or particles, increases from one end of the gas diffusion layer, corresponding to an inlet of the gas flow channel, to the other end of the gas diffusion layer corresponding to an outlet of the gas flow channel.

A gas diffusion layer according to a second manner for the second object of the present invention comprises: a porous supporting body, preferably a porous supporting carbon body; and an electrically conductive polymer-containing layer provided on the porous supporting body, wherein the electrically conductive polymer-containing layer comprises a polymer material and an electrically conductive carbon powder or carbon particles, which polymer material comprises at least a first polymer material and a second polymer material that has a lower degree of crystallinity than that of the first polymer material, and wherein the weight ratio of the second polymer material, relative to the first polymer material, increases from one end of the gas diffusion layer, corresponding to an inlet side of gas flow channel to the other end of the gas diffusion layer corresponding to an outlet side of the gas flow channel.

A gas diffusion layer according to a third manner for the second object of the present invention comprises: a porous supporting body, preferably a porous supporting carbon body; and an electrically conductive polymer-containing layer provided on the porous supporting body, wherein the electrically conductive polymer-containing layer comprises a polymer material and electrically conductive carbon particles, which polymer material comprises at least a first polymer material and a second polymer material that has a higher coefficient of moisture permeability than that of the first polymer, and wherein the weight ratio of the second polymer material, relative to the first polymer material, increases from one end of the gas diffusion layer, corresponding to an inlet of the gas flow channel, to the other end of the gas diffusion layer corresponding to an outlet of the gas flow channel.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
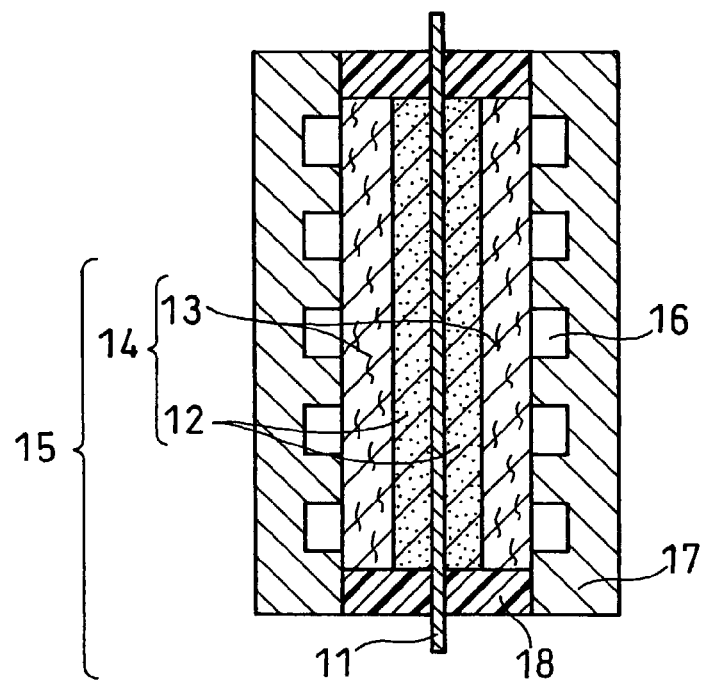
FIG. 1 is a cross-sectional view of a conventional polymer electrolyte fuel cell, schematically showing a main part of its structure.

Several aspects of the present invention will be described in the following Modes [I] and [II] accompanying EXAMPLEs thereof.

Mode [I]: Water Exhaustion and Water Retention in Thickness Direction of Gas Diffusion Layer According to a first manner of Mode [I] of the present invention, a gas diffusion layer in a polymer electrolyte fuel cell comprises a porous supporting carbon body, which has a pore distribution varying in a thickness direction of the gas diffusion layer or porous supporting carbon body. More specifically, the porous supporting carbon body has a larger number of smaller pores at its catalyst layer side, and a smaller number of larger pores at its separator plate side. In the case that a carbon cloth is used for the porous supporting carbon body, a larger number of smaller pores can be realized by using a carbon cloth having a finer mesh. Such varying pore distribution makes it possible to realize a good balance between the function of retaining necessary water at the catalyst layer and the function of exhausting excessive water from the gas diffusion layer.

More specifically, water at the catalyst layer can be retained at a portion of the gas diffusion layer, which portion has a larger number of smaller pores. When excessive water is generated and overflows from the catalyst layer to a major part of the gas diffusion layer, the water is drawn to a portion of the gas diffusion layer having a smaller number of larger pores. The larger pores can more readily exhaust the water to outside, so that excessive water can be more quickly taken away thereby from the catalyst layer. At the portion of the gas diffusion layer or porous carbon body having larger pores, the water and the gas are separated from each other. In other words, water exhaustion paths are separated from gas passing paths, so that necessary water exhaustion property and necessary water retention property at the catalyst layer can be realized at the same time.

According to a second manner of Mode [I] of the present invention, a gas diffusion layer in a polymer electrolyte fuel cell comprises a carbon cloth having first mesh portions and second mesh portions, wherein the second mesh portions are coarser than the first mesh portions, and are distributed among the first mesh portions intermittently in a direction of the surface plane thereof. In other words, pore distribution varies in the surface plane direction of the carbon cloth in a manner that smaller pore portions and larger pore portions are alternately arranged. Thereby, necessary water exhaustion property at the gas diffusion layer and necessary gas diffusion to the catalyst layer can be realized at the same time.

More specifically, excessive water generated at the catalyst layer is drawn to the larger pores, and is quickly taken away from the catalyst layer. Meanwhile, the gas is diffused toward the catalyst layer through the smaller pores, so that the water exhaustion paths are separated from the gas passing or gas diffusion paths, thereby to realize above described necessary water exhaustion property at the gas diffusion layer and necessary gas diffusion to the catalyst layer.

Each of the pair of gas diffusion layers according to the first manner and the second manner in Mode [I] is preferred to comprise an electrically conductive polymer-containing layer provided thereon at the catalyst layer side thereof, wherein the electrically conductive polymer-containing layer comprises a polymer material and electrically conductive carbon particles. More preferably, the polymer material of the electrically conductive polymer-containing layer is to contain a fluorocarbon resin. This feature brings about effects that excessive water at the catalyst layers can more effectively be exhausted, and that the porous supporting carbon bodies can be prevented from intruding into the ion conductive polymer membrane, thereby to prevent short-circuiting of the gas diffusion electrodes.

In order to allow the gas diffusion layer to have a larger number of smaller pores at the catalyst layer side and a smaller number of larger pores at the other side in a fuel cell according to the first manner in Mode [I], the present invention provides the following three manners: (1) to stack plural carbon cloths having meshes of different finenesses, i.e. a finer mesh of carbon cloth and a coarser mesh of carbon cloth; (2) to weave plural layers of wefts by common warps in a manner that one of the weft layers has a shorter average inter-weft distance than that of another one of the weft layers; and (3) to stack a carbon unwoven fabric and a carbon cloth.

The fineness or coarseness of a mesh of a carbon cloth can be realized by using plural threads having different diameters. By using threads having a larger diameter, the mesh of a resultant carbon cloth can become coarser, namely that the number of threads per unit cross section of the carbon cloth becomes smaller, whereby pores in the unit cross section become smaller in number and larger in average size thereof.

This can be more specifically described by the number of threads, either warps or wefts, at a unit cross section cut by a plane parallel to and between neighboring wefts or warps and perpendicular to the carbon cloth surface. For example, let us assume that three kinds of threads having diameters of 200 μm, 300 μm and 600 μm, respectively, are prepared by stranding up carbon fibers having a diameter of 10 μm, and that three kinds of single-layer carbon cloths are woven by using the three kinds of threads, respectively, in a manner that each of the three single-layer carbon cloths is woven by using only one of the three kinds of threads.

On this assumption, the number of wefts or warps at the unit cross section, as defined above, and having a length of 1 inch of each single-layer carbon cloth (thickness of the cross section being that of the carbon cloth) in the case of using the threads having a diameter of 200 μm is 70. Likewise, the numbers of threads, having diameters of 300 μm and 600 μm respectively, at the unit cross section of 1 inch in the other two single layer carbon cloths are 60 and 40, respectively. If strip shaped threads each having a width of 1 mm, as a fourth kind, are used as both the wefts and warps for a single-layer carbon cloth, the number of threads at the unit section of 1 inch is 12.

Regarding carbon unwoven fabrics, apparent densities thereof are to be varied for varying pore distributions therein. Specifically, the pore distributions of carbon unwoven fabrics can be varied by selecting one from among unwoven fabrics, such as carbon papers, having different apparent densities. A carbon unwoven fabric having a higher apparent density has a larger number of averagely smaller pores.

Such carbon unwoven fabrics can be custom-made, but can also be selected from among commercially available ones. With respect to commercially available carbon unwoven fabrics, e.g. carbon papers manufactured by Mitsubishi Rayon Co., Ltd. (Model No. MFG-070 and MFV4-120) have apparent densities of 0.44 g/cm$^3$ and 0.49 g/cm$^3$, respectively. A carbon paper manufactured by Toray Industries, Inc. (Model No. TGP-H-060) has an apparent density of 0.42 to 0.46 g/cm$^3$. Further, a carbon paper manufactured by Ballard Material Products Inc. (Model No. AvCarb P50T) and a carbon paper manufactured by Nippon Carbon Co., Ltd. (Model No. GF-20-N05) have apparent densities of 0.28 g/cm$^3$ and 0.06 g/cm$^3$, respectively.

Next, in order to obtain a carbon cloth according to a second manner of Mode [I], which has plural kinds of mesh portions different from each other in the fineness or coarseness of the mesh, wherein one kind of mesh portions are intermittently or periodically arranged among another kind of the mesh portions, the present invention provides the following two manners: (1) to intermittently or alternately or periodically arrange plural kinds of threads having different diameters; and (2) to intermittently or periodically vary inter-weft distances in the carbon cloth, in both manners of which the resultant carbon cloth gets to have unique mesh distributions. In these manners (1) and (2), the resultant mesh distributions are not necessary to be periodic. However, if the mesh distributions are random, the resultant fuel cell may suffer variations of characteristics depending on the locations on the surface of the carbon cloth or gas diffusion layer, whereby the resultant cell voltage may get lowered thereby. Accordingly, the mesh distributions of the carbon cloth are preferred to be periodic for the purpose of obtaining uniform characteristics with respect to the whole surface of the carbon cloth or gas diffusion layer.

The size of each mesh can be defined by a distance between neighboring threads arranged in parallel, namely inter-thread distance. Thus, the size of the mesh can be varied by varying inter-tread distance, either inter-weft distance or inter-warp distance. Further, by arranging threads having a larger diameter, the mesh defined thereby can become larger.

This can more specifically be described as follows. For example, in the case when a weft having a diameter of 600 μm made by stranding up 10 μm diameter carbon fibers is interveningly placed for every several consecutive wefts each having a diameter of 300 μm made by stranding up 10 μm, then the distance between neighboring wefts each having a diameter of 300 μm is about 0.42 mm, while the distance between the intervened weft having a diameter of 600 μm and a neighboring weft having a diameter of 300 μm is about 0.53 mm.

Instead of using such different threads, a unique mesh distribution can also be obtained by intermittently taking out threads in a carbon cloth. For example, in a carbon cloth made of wefts each having a diameter of 300 μm and being made by stranding up carbon fibers having a diameter of 10 μm, in which one weft thereof is taken out for every several consecutive wefts, the distance between neighboring wefts in the every several consecutive wefts is about 0.42 mm, while the distance between neighboring wefts with a weft therebetween having been taken out is about 0.84 mm.

The porous supporting carbon bodies or carbon cloths, in a polymer electrolyte fuel cell according to the first and the second manners in Mode [I], are preferred to have water repellent property, namely to have been subjected to water repellent treatment. This is particularly preferable for the purpose of cell operation at a high current density. This is to prevent water from retaining in the gas diffusion layer even when the cell is discharged at a high current density. An example of such water repellent treatment is to impregnate a liquid dispersion of PTFE in the porous supporting carbon bodies or the carbon cloths, and then to subject them to heat treatment.

The carbon cloth can ordinarily be woven by using carbon fiber threads. However, a more effective way, when a complicated mesh structure is needed, is to firstly weave a cloth by using e.g. polyacrylonitrile (PAN hereafter) fiber, and then to subject the cloth to heat treatment in an inert gas. Generally, nitrogen is to be used as the inert gas, and the temperature for the heat treatment is from 1,000° C. to 2,000° C.

Hereinafter, the Mode [I] of the present invention will more specifically be described in the following EXAMPLES [I].

EXAMPLES [I]

Example I-1

Figure 2:
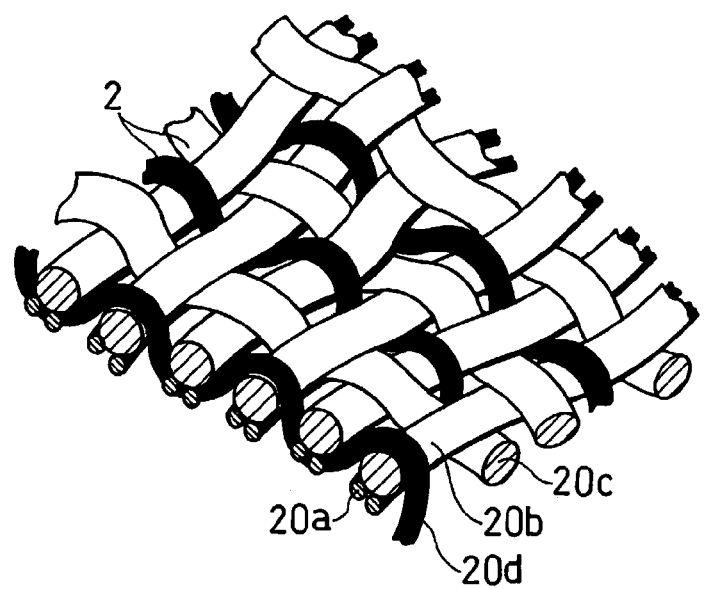
FIG. 2 is an oblique view, partially in cross-section, of a carbon cloth in EXAMPLE I-1 according to Mode of Embodying the Invention [I] of the present invention (Mode [I] hereafter), schematically showing its structure.

Firstly, as schematically shown in FIG. 2, a carbon cloth, having a finer mesh at the catalyst layer side thereof and a coarser mesh at the separator plate side thereof, was made as follows.

Threads each having a diameter of about 300 μm and made by stranding up PAN fibers having a diameter of about 10 μm was prepared as wefts 20a for a first layer. Likewise, threads each having a diameter of about 600 μm and made by stranding up PAN fibers having a diameter of about 10 μm was prepared as wefts 20b for a second layer. The threads having a diameter of about 600 μm were further used as warps 20c in the second layer to knit the wefts 20b of the second layer. Further, the threads having a diameter of about 300 μm were used as warps 20d to knit the wefts 20a, 20b of both the first layer and the second layer. Thereby, a cloth or precursor of carbon cloth 20 was made.

The thus made precursor of carbon cloth was heated to be graphitized at 2,000° C. in a nitrogen atmosphere for 24 hours, thereby to make a carbon cloth. FIG. 2 is an oblique view, partially in cross-section, of such carbon cloth 20 seen from the second layer side, schematically showing its structure.

Into the thus made carbon cloth, a liquid dispersion of PTFE (product of Daikin Industries, Ltd.: Lubron LDW-40) was impregnated so that the carbon cloth had 10 wt % of PTFE in dry weight. The carbon cloth with the liquid dispersion of PTFE was heated at 350° C. by using a hot-air drier, thereby to have water repellent property.

Thereafter, a layer made of a carbon powder and a fluorocarbon resin, that is an electrically conductive polymer-containing layer, was formed on the carbon cloth as follows. Firstly, a liquid dispersion of carbon made by dispersing a carbon powder (product of Denki Kagaku Kogyo Kabushiki Kaisha: Denka Black) in a liquid dispersion of PTFE (product of Daikin Industries, Ltd.: Lubron LDW-40), so that the liquid dispersion of carbon particles and the PTFE resin had 30 wt % of PTFE in dry weight. This liquid dispersion of the carbon particles and the PTFE resin was coated on the first layer side, i.e. finer mesh side, of the carbon cloth having been subjected to water repellent treatment, and was heated at 350° C. by using a hot-air dryer, thereby to make a gas diffusion layer having an electrically conductive polymer-containing layer. At the surface of the carbon cloth having the electrically conductive polymer-containing layer, a part of the polymer-containing layer is buried in the carbon cloth, while the other part thereof is positioned on the surface of the carbon cloth.

Next, an MEA was made as follows. A mixture of: 10 g of an electrically conductive carbon powder (product of Tanaka Kikinzoku Kogyo K.K.: TEC10E50E), carrying 50 wt % of platinum particles having an average particle size of about 30 Å; 10 g of water; and 55 g of an ethanol solution of an ion conductive polymer electrolyte in an amount of 9 wt % (product of Asahi Glass Co., Ltd.: Flemion) was prepared as a paste for a catalyst layer. This paste was coated on a polypropylene film by bar coating using a wire bar, and was dried, thereby to obtain a catalyst layer for oxidant gas diffusion electrode or cathode. An adjustment was made so that the amount of the coated catalyst layer had 0.3 mg/cm$^2$ of platinum.

Likewise, a mixture of: 10 g of an electrically conductive carbon powder (product of Tanaka Kikinzoku Kogyo K.K.: TEC61E54), carrying platinum-ruthenium alloy particles; 10 g of water; and 50 g of an ethanol solution of an ion conductive polymer electrolyte in an amount of 9 wt % (product of Asahi Glass Co., Ltd.: Flemion) was prepared as a paste for a catalyst layer. This paste was coated on a polypropylene film by bar coating using a wire bar, and was dried, thereby to obtain a catalyst layer for fuel gas diffusion electrode or anode. An adjustment was made so that the amount of the coated catalyst layer had 0.3 mg/cm$^2$ of platinum.

Each of the thus made two polypropylene films was respectively cut to have a shape of 6 cm square. An ion conductive polymer electrolyte membrane (product of Japan Gore-Tex Inc.: Gore-Select) having a thickness of 30 μm was sandwiched by the above made two 6 cm square polypropylene films in a manner that the respective catalyst layers contacted the electrolyte membrane, and was hot-pressed at 130° C. for 10 minutes. Thereafter, the polypropylene films were taken away, thereby to obtain a polymer electrolyte membrane with the catalyst layers.

Figure 3:
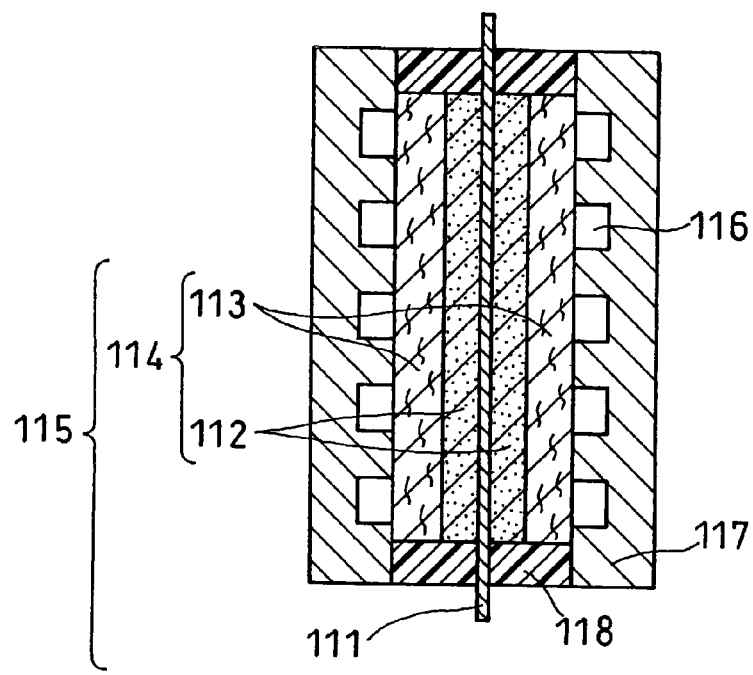
FIG. 3 is a cross-sectional view of a polymer electrolyte fuel cell according to EXAMPLE I-1 and other EXAMPLEs of the present invention, schematically showing a main part of its structure.

The thus made polymer electrolyte membrane with the catalyst layers was sandwiched by a pair of gas diffusion layers 113 in a manner that the first layers of the respective gas diffusion layers contacted the catalyst layers on the electrolyte membrane, thereby to obtain an MEA, as shown in FIG. 3. By using the thus made MEA, a unit cell as a polymer electrolyte fuel cell for characteristics measurement was assembled. FIG. 3 schematically shows a structure of such unit cell as described in the following.

Referring to FIG. 3, opposite main surfaces of a polymer electrolyte membrane 111 for selectively transporting hydrogen ions are provided with a pair of catalyst layers 112 to intimately contact the membrane respectively. Each catalyst layer 112 has a carbon powder as a main component and carrying platinum metal catalyst. Outside the respective catalyst layers 112 are provided a pair of gas diffusion layers to intimately contact the catalyst layers 112, wherein each gas diffusion layer 113 comprises a porous supporting carbon body, made of porous carbon material and supporting e.g. the catalyst layer. A combination of each gas diffusion layer 113 and each catalyst layer 112 constitutes a gas diffusion electrode 14.

A pair of separator plates 117 are provided outside the pair of gas diffusion electrodes 114 which mechanically fix an MEA 115 constituted by the gas diffusion electrodes 114 and the polymer electrolyte membrane 111, and which have gas flow channels 116 at the surfaces thereof contacting gas diffusion electrodes for supplying the reactive gases to the gas diffusion electrodes, and for exhausting, to outside, water generated by the electrochemical reaction and excessive gases. Further, gaskets 118 are provided and sandwiched between the polymer electrolyte membrane 111 and the separator plates 117 for preventing the reactive gases from leaking to outside.

Figure 4:
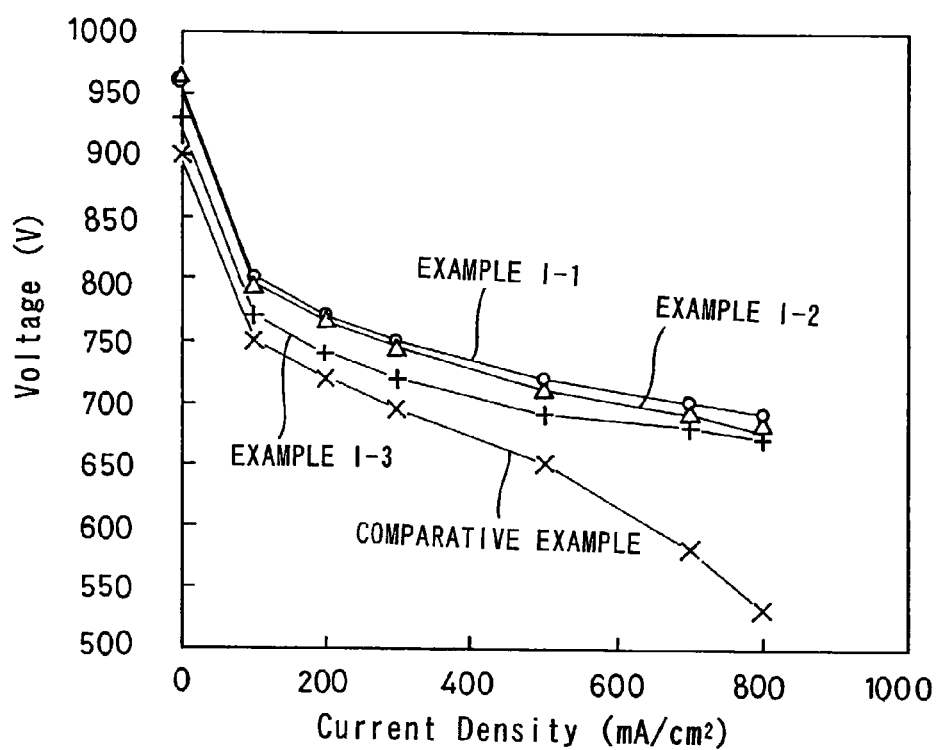
FIG. 4 is a graph showing current density-voltage characteristics of unit cells prepared in EXAMPLEs I-1 to I-3 and COMPARATIVE EXAMPLE according to Mode [I].

The temperature of the unit cell was set at 70° C., and was supplied at an anode thereof with a hydrogen gas humidified and heated to have a dew point of 70° C., and was also supplied at a cathode thereof with air humidified and heated to have a dew point of 60° C. This unit cell was then subjected to a discharge or power generation test under the conditions of a hydrogen utilization rate of 80%, and an air utilization rate of 40% with an electric current flowing at a density from 0 to 800 mA/cm². By measurements, it was found that the unit cell showed good discharge voltages, irrespectively of the current densities. One curve designated by EXAMPLE I-1 in FIG. 4 shows such measured current density-voltage characteristics of the unit cell.

This was owing to the unique carbon cloth having a finer mesh at the catalyst layer side and a coarser mesh at the separator plate side, i.e. a larger number of smaller pores at the catalyst layer side and a smaller number of larger pores at the separator plate side. Because of the unique carbon cloth, water generated at the catalyst layer was quickly sucked out to the gas diffusion layer, which in turn evaporated the water therein, thereby to effectively exhaust the water to outside the unit cell. Thereby, excessive water did not retain in the gas diffusion electrode, and at the same time, the polymer electrolyte membrane was maintained at an appropriate wet condition.

Example I-2

Figure 5:
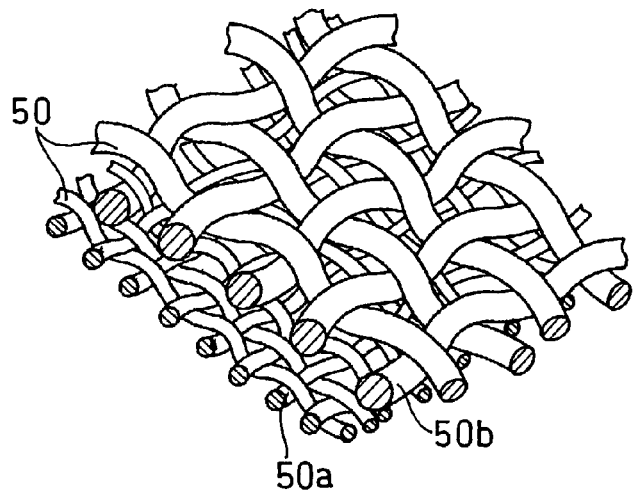
FIG. 5 is an oblique view, partially in cross-section, of a carbon cloth in EXAMPLE I-2 according to Mode [I], schematically showing its structure.

A multi-layer carbon cloth 50 as schematically shown in FIG. 5 was made as follows. A first cloth was made by plain weave, using threads having a diameter of about 300 µm and having been made by stranding up PAN fibers having a diameter of about 10 µm. A second cloth was likewise made by plain weave, using threads having a diameter of about 600 µm and having been made by stranding up PAN fibers having a diameter of about 10 µm. The first cloth and the second cloth were then heated at 2,000° C. in a nitrogen atmosphere for 24 hours to get graphitized to be carbon cloths.

These carbon cloths were subjected to water repellent treatment in a manner similar to that described in EXAMPLE I-1, and the carbon cloth 50a made of the first cloth was stacked on the carbon cloth 50b made of the second cloth to be the multi-layer carbon cloth 50. FIG. 5 is an oblique view, partially in cross-section, of such multi-layer carbon cloth 50 seen from the second cloth side, schematically showing its structure. As in EXAMPLE I-1, an electrically conductive polymer-containing layer made of a carbon powder and a fluorocarbon resin was formed on the carbon cloth 50a made of the first cloth, thereby to make a gas diffusion layer.

By using the thus made gas diffusion layer, a unit cell for characteristics measurements was made, and was subjected to a discharge test in the same manner as in EXAMPLE I-1. It was found thereby that the unit cell according to the present EXAMPLE showed good discharge voltages, irrespectively of the current densities. One curve designated by EXAMPLE I-2 in FIG. 4 shows such measured current density-voltage characteristics of the unit cell.

Example I-3

Figure 6:
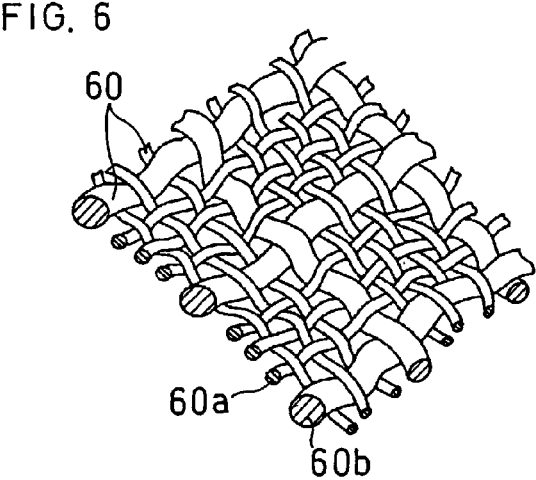
FIG. 6 is an oblique view, partially in cross-section, of a carbon cloth in EXAMPLE I-3 according to Mode [I], schematically showing its structure.

A single layer carbon cloth 60 as schematically shown in FIG. 6 was made as follows. A cloth was made by plain weave, using threads having a diameter of about 300 µm and having been made by stranding up PAN fibers having a diameter of about 10 µm, and also using threads having a diameter of about 600 µm and having been made by stranding up PAN fibers having a diameter of about 10 µm. More specifically, each 600 µm thread was placed for every consecutive three 300 µm threads for both the wefts and the warps, so that each 600 µm thread was placed between neighboring two groups of three consecutive threads as to both the weft arrangement and the warp arrangement as can be understood from FIG. 6. The thus made cloth was then heated at 2,000° C. in a nitrogen atmosphere for 24 hours to get graphitized to be the carbon cloth 60.

FIG. 6 is an oblique view, partially in cross-section, of such carbon cloth 60, schematically showing its structure. The thus made carbon cloth was subjected to water repellent treatment in a manner similar to that described in EXAMPLE I-1. Thereafter, as in EXAMPLE I-1, an electrically conductive polymer-containing layer made of a carbon powder and a fluorocarbon resin was formed on the carbon cloth, thereby to make a gas diffusion layer.

By using the thus made gas diffusion layer, a unit cell for characteristics measurements was made, and was subjected to a discharge test in the same manner as in EXAMPLE I-1. It was found thereby that the unit cell according to the present EXAMPLE showed good discharge voltages, irrespectively of the current densities. One curve designated by EXAMPLE I-3 in FIG. 4 shows such measured current density-voltage characteristics of the unit cell.

Example I-4

Figure 7:
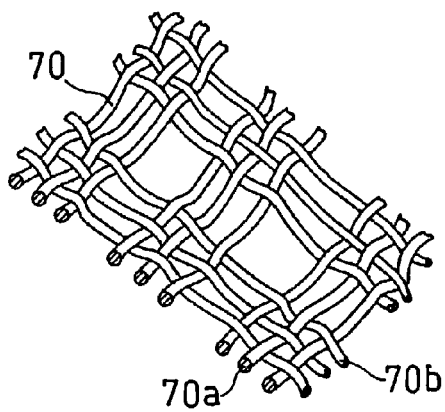
FIG. 7 is an oblique view, partially in cross-section, of a carbon cloth in EXAMPLE I-4 according to Mode [I], schematically showing its structure.

A single-layer carbon cloth 70 as schematically shown in FIG. 7 was made as follows. A cloth was made by plain weave, using threads having a diameter of about 300 µm and having been made by stranding up PAN fibers having a diameter of about 10 µm. More specifically, one thread was taken out for every four consecutive threads for both the wefts and the warps, so that a space for one thread was left without arranging thereat a thread between neighboring two groups of three consecutive threads, whereby a distance of about twice the distance between neighboring two threads in each group of three consecutive threads was made between two neighboring groups of three consecutive threads as to both the weft arrangement and the warp arrangement as can be understood from FIG. 7. The thus made cloth was then heated at 2,000° C. in a nitrogen atmosphere for 24 hours to get graphitized to be the carbon cloth 70.

FIG. 7 is an oblique view, partially in cross-section, of such carbon cloth 70, schematically showing its structure. The thus made carbon cloth was subjected to water repellent treatment in a manner similar to that described in EXAMPLE I-1. Thereafter, as in EXAMPLE I-1, an electrically conductive polymer-containing layer made of a carbon powder and a fluorocarbon resin was formed on the carbon cloth, thereby to make a gas diffusion layer.

Figure 9:
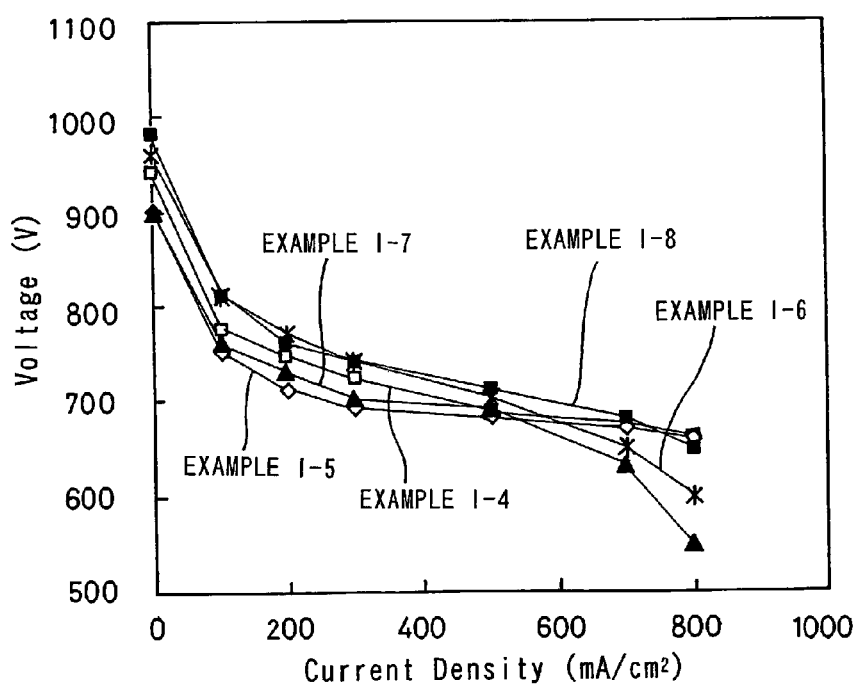
FIG. 9 is a graph showing current density-voltage characteristics of unit cells prepared in EXAMPLEs I-4 to I-8 according to Mode [I].

By using the thus made gas diffusion layer, a unit cell for characteristics measurements was made, and was subjected to a discharge test in the same manner as in EXAMPLE I-1. It was found thereby that the unit cell according to the present EXAMPLE showed good discharge voltages, irrespectively of the current densities. One curve designated by EXAMPLE I-4 in FIG. 9 shows such measured current density-voltage characteristics of the unit cell.

Example I-5

A gas diffusion layer according to the present EXAMPLE I-5 was made in the same manner as in EXAMPLE I-1 except that here the electrically conductive polymer-containing layer made of a carbon powder and a fluorocarbon resin was not formed on the gas diffusion layer. By using the thus made gas diffusion layer according to the present EXAMPLE, a unit cell for characteristics measurements was made, and was subjected to a discharge test in the same manner as in EXAMPLE I-1. It was found thereby that the unit cell according to the present EXAMPLE showed sufficiently high discharge voltages at high current densities, although it showed relatively low discharge voltages at low current densities. One curve designated by EXAMPLE I-5 in FIG. 9 shows such measured current density-voltage characteristics of the unit cell.

Example I-6

A gas diffusion layer according to the present EXAMPLE I-6 was made in the same manner as in EXAMPLE I-1 except that here the carbon cloth was not subjected to the water repellent treatment. By using this gas diffusion layer according to the present EXAMPLE, a unit cell for characteristics measurements was made, and was subjected to a discharge test in the same manner as in EXAMPLE I-1. It was found thereby that the unit cell according to the present EXAMPLE showed high discharge voltages at low current densities, although it showed relatively low discharge voltages at high current densities. One curve designated by EXAMPLE I-6 in FIG. 9 shows such measured current density-voltage characteristics of the unit cell.

Example I-7

A gas diffusion layer according to the present EXAMPLE I-7 was made in the same manner as in EXAMPLE I-1 except that here the electrically conductive polymer-containing layer made of a carbon powder and a fluorocarbon resin was not formed on the gas diffusion layer, and that the carbon cloth was not subjected to the water repellent treatment. By using the thus made gas diffusion layer according to the present EXAMPLE, a unit cell for characteristics measurements was made, and was subjected to a discharge test in the same manner as in EXAMPLE I-1. It was found thereby that the unit cell according to the present EXAMPLE showed sufficiently high discharge voltages at low current densities, although it showed relatively low discharge voltages at high current densities. One curve designated by EXAMPLE I-7 in FIG. 9 shows such measured current density-voltage characteristics of the unit cell.

Example I-8

Figure 10:
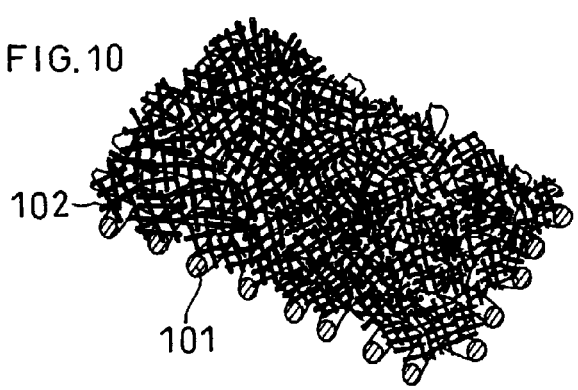
FIG. 10 is an oblique view, partially in cross-section, of a stack of a carbon cloth and a carbon paper in EXAMPLE I-8 according to Mode [I], schematically showing its structure.

As shown in FIG. 10, a multi-layered porous supporting carbon body made of a carbon cloth 101 and a carbon paper 102 was made as follows.

A cloth was made by plain weave, using threads having a diameter of about 300 µm and having been made by stranding up PAN fibers having a diameter of about 10 µm. The thus made cloth was then heated at 2,000° C. in a nitrogen atmosphere for 24 hours to get graphitized to be a carbon cloth 101. On the thus made carbon cloth 101, a carbon paper 102 (product of Toray Industries, Inc.: TGP-H-060) having a thickness of 180 µm was stacked, thereby to make a porous supporting carbon body, wherein the carbon paper 102 is to face the catalyst layer, with the pores thereof being smaller in size and larger in number than the pores of the carbon cloth 101.

FIG. 10 is an oblique view, partially in cross-section, of such multi-layer carbon body made of the carbon cloth 101 and the carbon paper 102, seen from the carbon paper side, schematically showing its structure. As in EXAMPLE I-1, an electrically conductive polymer-containing layer made of a carbon powder and a fluorocarbon resin was formed on the carbon paper of the carbon body, thereby to make a gas diffusion layer.

By using this gas diffusion layer, a unit cell for characteristics measurements was made, and was subjected to a discharge test in the same manner as in EXAMPLE I-1. It was found thereby that the unit cell according to the present EXAMPLE showed good discharge voltages, irrespectively of the current densities. One curve designated by EXAMPLE I-8 in FIG. 9 shows such measured current density-voltage characteristics of the unit cell.

Besides, in manners similar to those described in the above EXAMPLEs, various combinations of the first layers and the second layers for the porous supporting carbon bodies were studied with respect to (i) combination of a carbon cloth having a finer mesh for a first layer at a catalyst layer side, and a further carbon cloth having a coarser mesh for a second layer at a separator plate side, and (ii) combination of a carbon unwoven fabric of e.g. carbon paper having a large number of small pores for a first layer at a catalyst layer side, and a carbon cloth having a coarse mesh for a second layer at a separator plate side. Consequently, it was found that preferable current density-voltage characteristics of resultant fuel cells were obtained under certain conditions for the combinations (i) and (ii) as described below.

In the case of the combination (i), preferable results were obtained when the carbon cloth for the first layer had 40 to 70 threads per unit cross-section of the carbon cloth of 1 inch length as defined above, and when the carbon cloth for the second layer had 12 to 60 threads per the unit cross-section of the carbon cloth of 1 inch length, under the condition that the number of threads of the carbon cloth for the first layer was not less than 1.2 times that for the second layer. In the case of the combination (ii), preferable results were obtained when the carbon unwoven fabric for the first layer had an apparent density of 0.06 to 0.49 g/cm3 (namely, all the commercially available unwoven fabrics described above as examples could be used), and when the carbon cloth for the second layer had 12 to 60 threads per the unit cross-section of the carbon cloth of 1 inch length.

Furthermore, it was confirmed that although dual-layered porous supporting carbon bodies were exemplified in the above EXAMPLEs, other multi-layered bodies, such as triple-layered body, could also be used as long as the porosity distributions varied from a larger number of smaller pores at the catalyst layer side to a smaller number of larger pores at the separator plate side.

COMPARATIVE EXAMPLE

Figure 8:
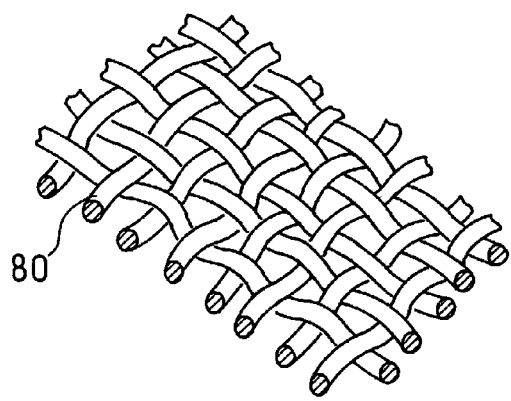
FIG. 8 is an oblique view, partially in cross-section, of a carbon cloth according to COMPARATIVE EXAMPLE in Mode [I], schematically showing its structure.

A single-layer carbon cloth 80 as schematically shown in FIG. 8 was made as follows. A cloth was made by plain weave, using threads having a diameter of about 300 µm and having been made by stranding up PAN fibers having a diameter of about 10 µm. The thus made cloth was then heated at 2,000° C. in a nitrogen atmosphere for 24 hours to get graphitized to be a carbon cloth 80. FIG. 8 is an oblique view, partially in cross-section, of such carbon cloth 80, schematically showing its structure.

The thus made carbon cloth 80 was subjected to water repellent treatment, and then a layer made of a carbon powder and a fluorocarbon resin was formed on the carbon cloth in a manner similar to that described in EXAMPLE I-1, thereby to obtain a gas diffusion layer.

By using the thus made gas diffusion layer, a unit cell for characteristics measurements was made, and was subjected to a discharge test in the same manner as in EXAMPLE I-1. It was found thereby that the unit cell according to the present COMPARATIVE EXAMPLE showed an undesired decrease of discharge voltage as the current density increased. One curve designated by COMPARATIVE EXAMPLE in FIG. 4 shows such measured current density-voltage characteristics of the unit cell.

Mode [II]: Uniform Water Retention at Gas Diffusion Layer from Inlet to Outlet of Gas Flow Channel <II-1. First Manner>

Figure 11:
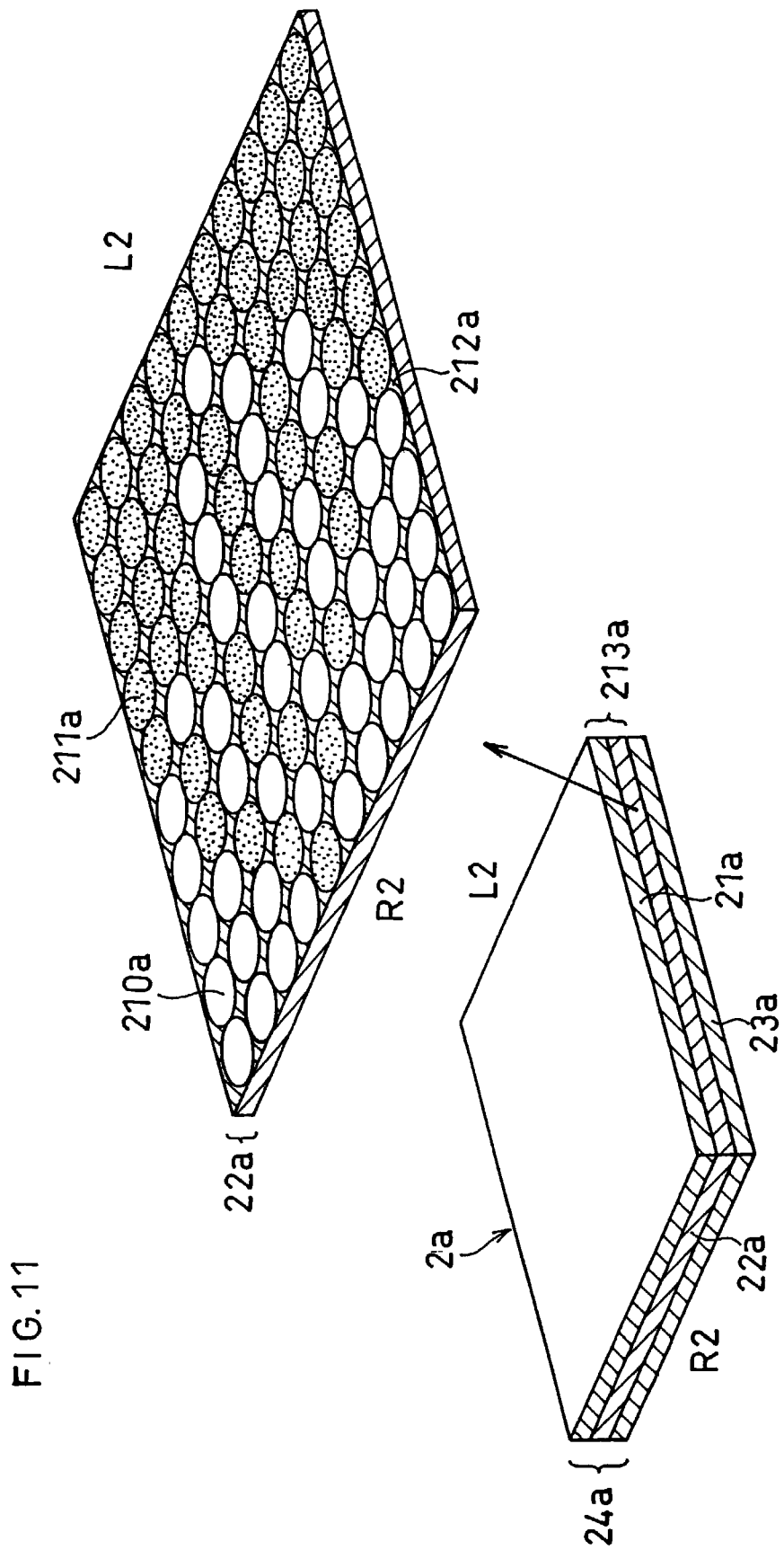
FIG. 11 is an oblique view, partially in cross-section, of a gas diffusion electrode and an electrically conductive polymer-containing layer in the gas diffusion layer of the gas diffusion electrode in EXAMPLE II-1 according to Mode of Embodying the Invention [II] of the present invention (Mode [II] hereafter), schematically showing its structure.

FIG. 11 is an oblique view, partially in cross-section, of a gas diffusion layer and a gas diffusion electrode 2a using the gas diffusion layer according to a first manner (First manner [II-1] hereafter) of Mode [II] of the present invention, seen from the gas diffusion layer side, schematically showing its structure.

As shown therein, a gas diffusion layer 213a comprises a porous supporting body 21a, preferably of carbon made of carbon fibers, and an electrically conductive polymer-containing layer 22a which is provided on a surface of the porous supporting body 21a and which comprises a polymer material 212a and electrically conductive carbon powders or particles 210a, 211a. A part of the electrically conductive polymer-containing layer 22a is buried in the porous supporting body 21a, although not shown in FIG. 11. On the surface of the electrically conductive polymer-containing layer 22a of the electrically conductive gas diffusion layer 213a, a catalyst layer 23a comprising an electrically conductive carbon powder or particles carrying platinum on the surface thereof is provided, thereby to form a gas diffusion electrode 24a.

The electrically conductive polymer-containing layer 22a has a mixture of at least two electrically conductive carbon powders or particles 210a, 211a respectively having different amounts of acidic function group from each other. Here, it is assumed that the second carbon particles 211a have a larger amount of acidic function group than that of the first carbon particles 210a. A main feature of the First manner [II-1] of Mode [II] here is that the weight ratio of the second carbon particles, relative to the first carbon particles, increases from one end R2 of the gas diffusion layer, corresponding to an inlet of the gas flow channel, to the other end L2 of the gas diffusion layer corresponding to an outlet of the gas flow channel, so that the total amount of the acidic function group increases from the one end R2 to the other end L2.

Here, specific examples of acidic function group are carbonyl group, hydroxyl group, quinone group, lactone group and the like. The amount of acidic function group is defined as number of molecules of such acidic function group per unit weight of carbon.

Figure 12:
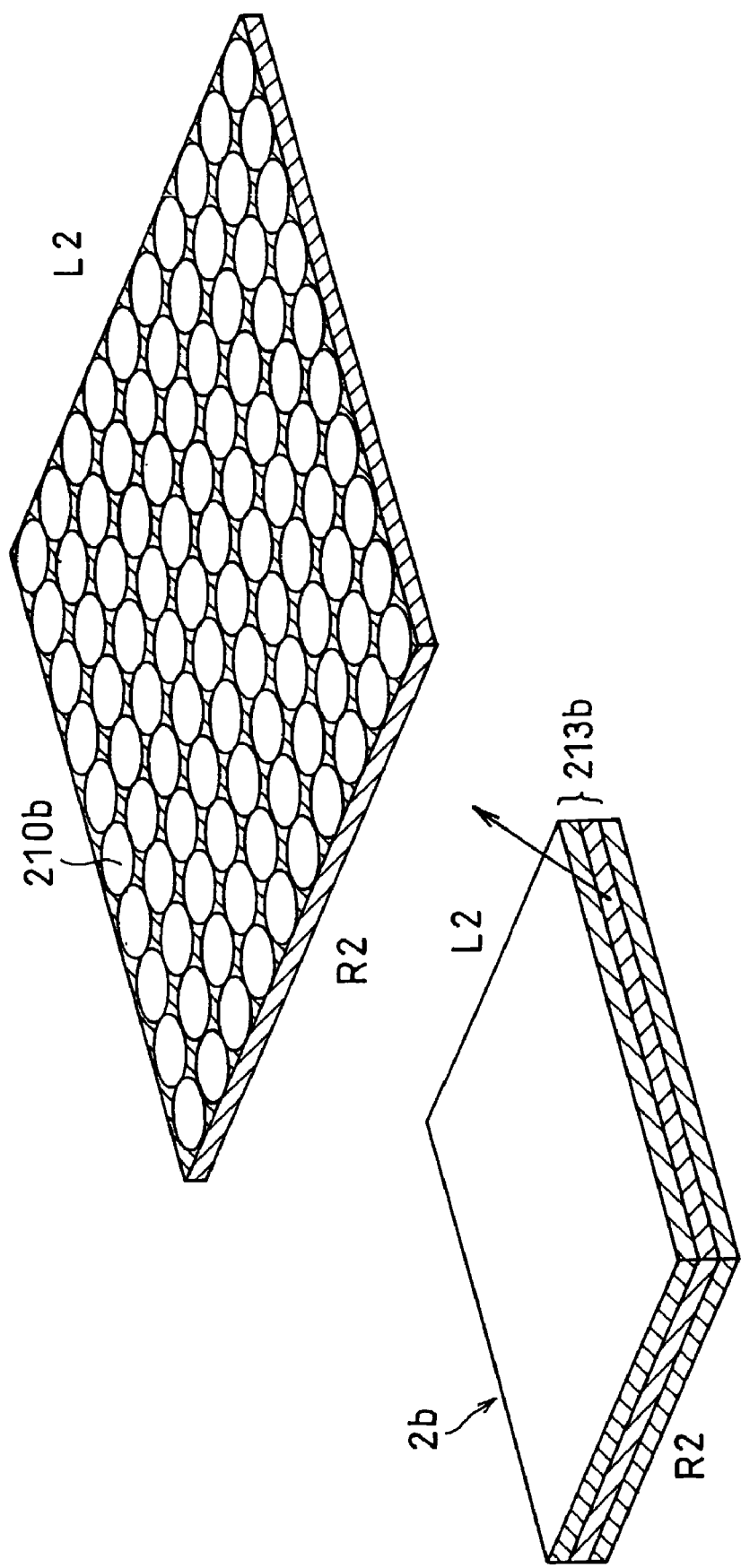
FIG. 12 is an oblique view, partially in cross-section, of a conventional gas diffusion electrode and a conventional electrically conductive polymer-containing layer in the conventional gas diffusion layer of the conventional gas diffusion electrode for reference in Mode [II], schematically showing its structure.

For reference, FIG. 12 is a an oblique view, partially in cross-section, of a conventional gas diffusion layer and a conventional gas diffusion electrode 2b using the conventional gas diffusion layer, schematically showing its structure. The basic structure of the gas diffusion electrode 2b is the same as that of the gas diffusion electrode 2a, but they are different from each other in that the electrically conductive polymer-containing layer, as a part of a gas diffusion layer 213, on the surface of the gas diffusion layer 213b has one electrically conductive carbon powder or particles 210b having a certain amount of acidic function group. Accordingly, the electrically conductive polymer-containing layer of the conventional structure has a substantially uniform distribution of the amount of acidic function group. It is to be noted that in FIG. 12, reference numerals of like elements in FIG. 11 are omitted, with corresponding description being also omitted for simplifying the description.

Figure 15:
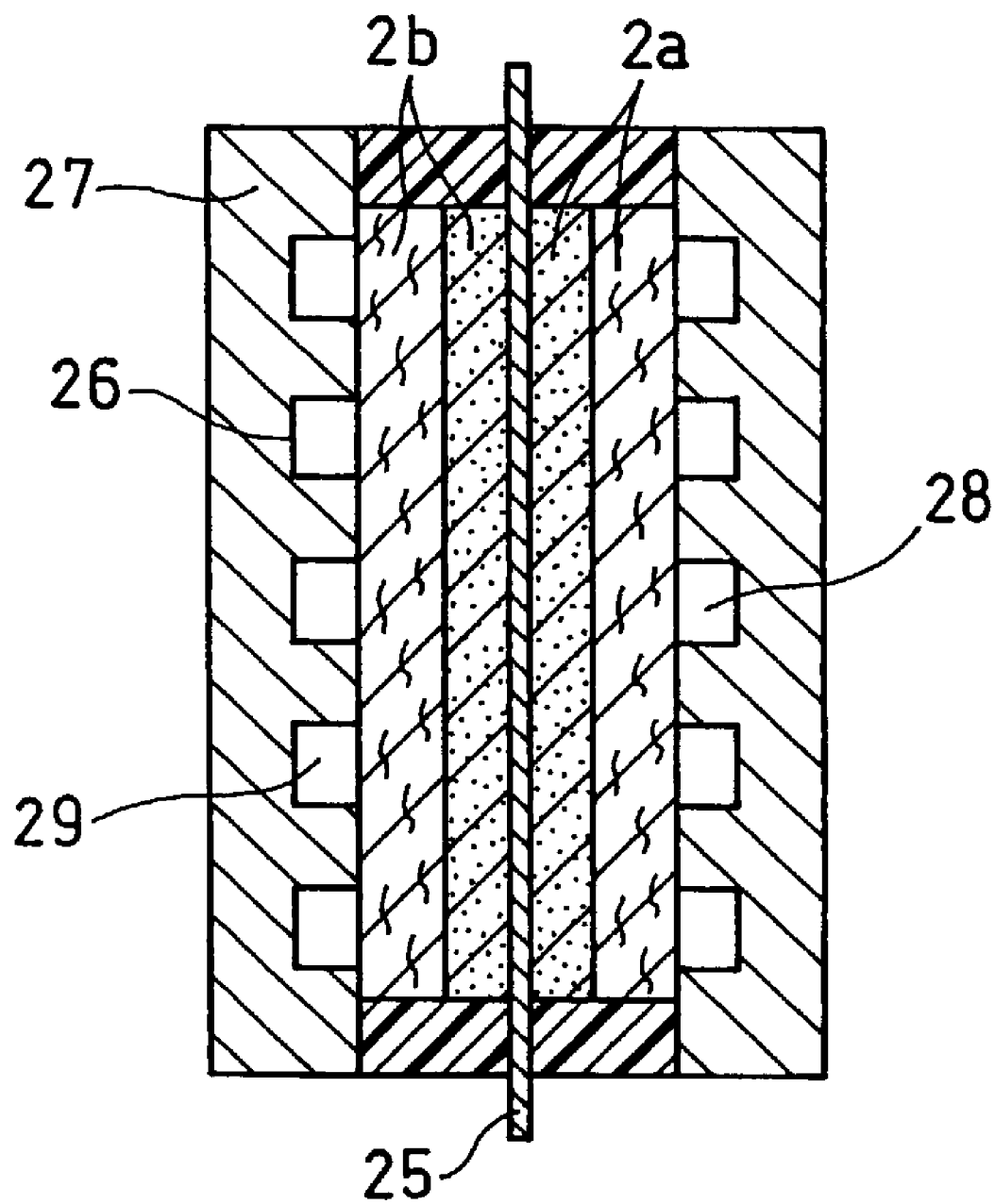
FIG. 15 is a cross-sectional view of a polymer electrolyte fuel cell according to EXAMPLE II-1 and other EXAMPLEs according to Mode [II], schematically showing a main part of its structure.
Figure 16:
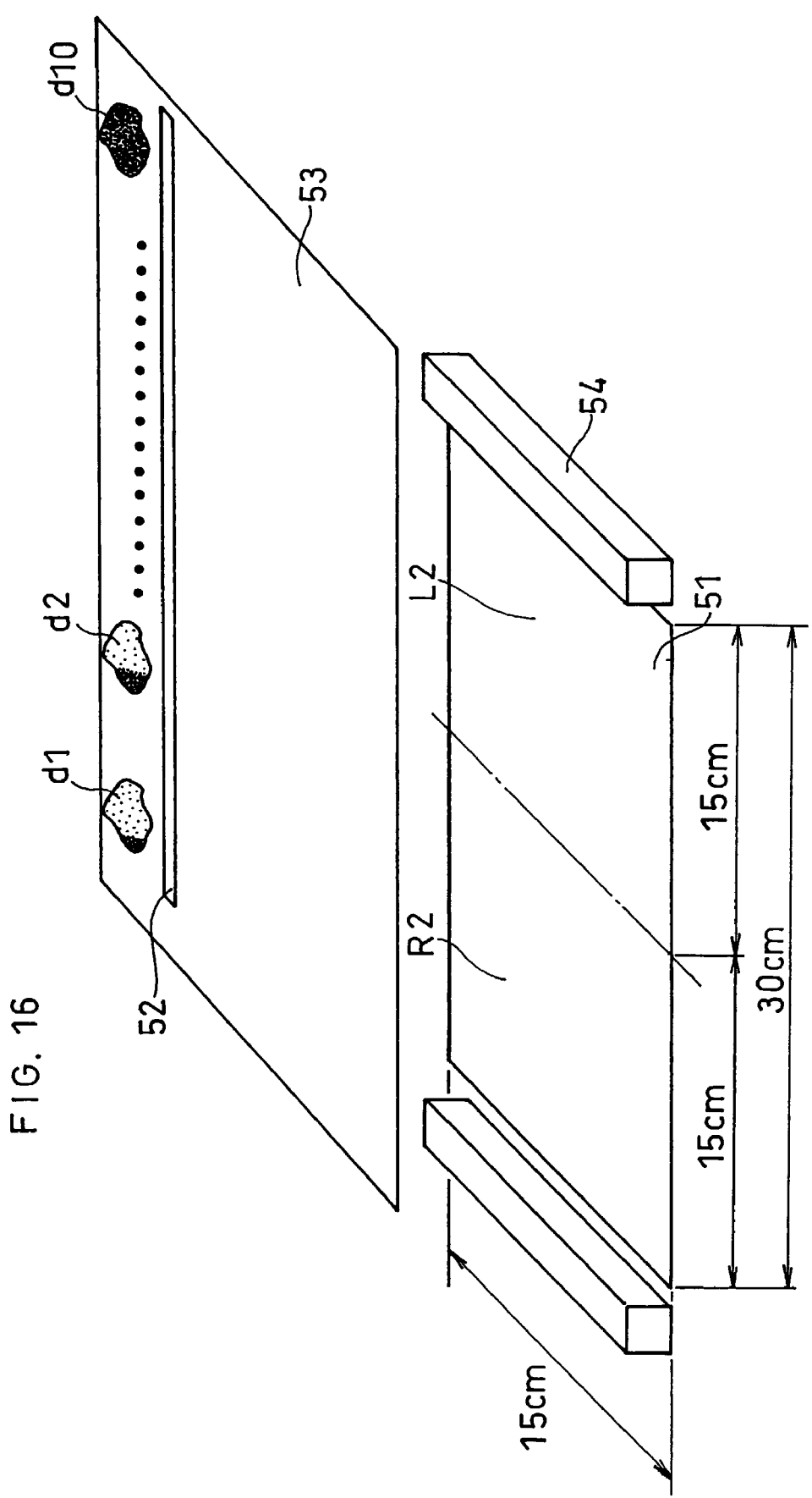
FIG. 16 is a perspective view schematically showing a process of coating liquid dispersions, for an electrically conductive polymer-containing layer, on a surface of a porous supporting carbon body for a gas diffusion layer according to Mode [II].

FIG. 15 is a cross-sectional view of a polymer electrolyte fuel cell made by using the gas diffusion electrode according to the First manner [II-1], schematically showing its structure. Referring to FIG. 15, a polymer electrolyte membrane 25 has the gas diffusion electrodes 2a and 2b on opposite main surfaces thereof, respectively, in a manner that the respective catalyst layers of the gas diffusion electrodes intimately contact the electrolyte membrane, thereby to form an MEA.

Further, a pair of separator plates 27 having gas flow channels 26 are provided to sandwich the MEA therebetween in a manner that the respective gas flow channels 26 face the respective surfaces of the MEA, thereby to supply air, as an oxidant gas, to the gas diffusion electrode 2a therethrough, and to supply hydrogen, as a fuel, to the gas diffusion electrodes 2b therethrough. The end R2 shown in FIG. 11 is positioned at an inlet side of the oxidant gas 28, while the end L2 shown in FIG. 11 is positioned at an outlet side of the oxidant gas 28.

Owing to the structure as described above, the whole region of the MEA from the end R2 to the end L2 can be controlled to have a uniform water distribution. More specifically, in a gas diffusion layer of the oxidant gas side or oxidant gas diffusion electrode side, in which uniform water control is considered to be difficult because of the water generated by cell reaction, it becomes possible to skillfully perform uniform water control by introducing graduation of the amount of acidic function group.

At the outlet side of the oxidant gas in comparison with the inlet side of the oxidant gas, the gas diffusion layer has a larger amount of the acidic function group of the electrically conductive carbon particles, so that the electrically conductive carbon particles can get wetter. Accordingly, it becomes possible that water at the outlet side of the oxidant gas is more readily brought to or to the vicinity of the gas flow channel of the separator plate along the surface of the gas diffusion layer, and can be more readily exhausted thereby to outside the cell together with the oxidant gas.

At the inlet side of the oxidant gas in comparison with the outlet side of the oxidant gas, on the other hand, the electrically conductive particles can be less wet because of the smaller amount of acidic function group thereof. Accordingly, water there is less readily brought toward the gas flow channel of the separator plate, whereby water is more likely to be retained inside the cell.

Here, an example of a combination of electrically conductive carbon particles having different amounts of acidic function group is a combination of an acetylene black per se and an acetylene black having been oxidized in e.g. air to have a larger amount of acidic function group than that of the original acetylene black. Other examples of such combinations of (a) carbon particles having a smaller amount of acidic function group with (b) carbon particles having a larger amount of acidic function group are: (a) acetylene black with (b) furnace black; (a) graphitized black with (b) furnace black, and the like.

<II-2. Second Manner>

Figure 13:
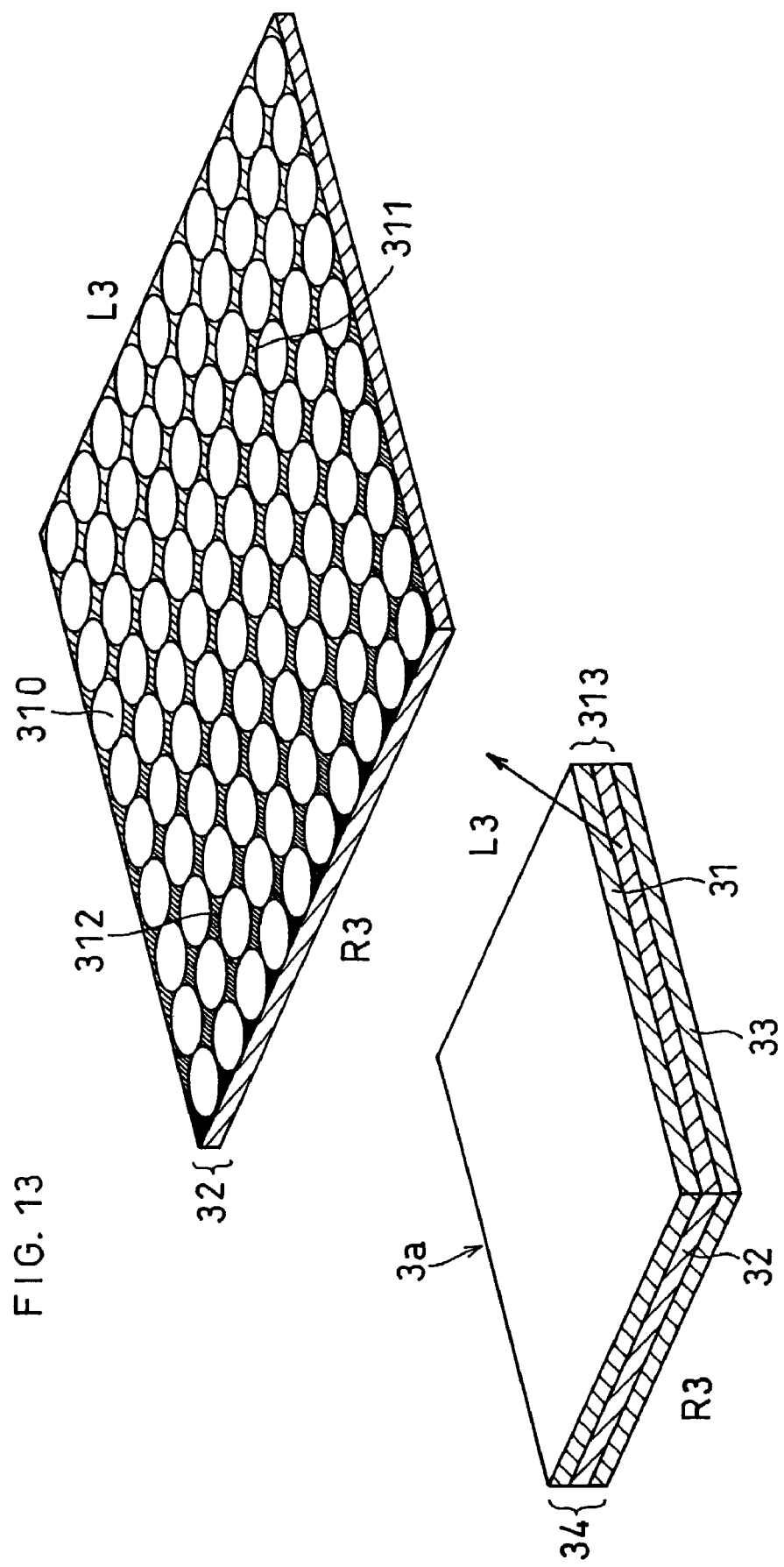
FIG. 13 is an oblique view, partially in cross-section, of a gas diffusion electrode and an electrically conductive polymer-containing layer in the gas diffusion layer of the gas diffusion electrode in EXAMPLE II-2 according to Mode [II], schematically showing its structure.

FIG. 13 is an oblique view, partially in cross-section, of a gas diffusion layer and a gas diffusion electrode 3a using the gas diffusion layer according to a second manner (Second manner [II-2] hereafter) of Mode [II] of the present invention, seen from the gas diffusion layer side, schematically showing its structure.

As shown therein, a gas diffusion layer 313 comprises a porous supporting body 31, preferably of carbon made of carbon fibers, and an electrically conductive polymer-containing layer 32 being provided on a surface of the porous supporting body 31 and comprising an electrically conductive carbon powder or particles 310 and at least two polymer materials 311 and 312. A part of the electrically conductive polymer-containing layer 32 is buried in the porous supporting body 31, although not shown in FIG. 13. On the surface of the electrically conductive polymer-containing layer 32 of the gas diffusion layer 313, a catalyst layer 33 comprising an electrically conductive carbon powder or particles carrying platinum on the surface thereof is provided, thereby to form a gas diffusion electrode 34.

The electrically conductive polymer-containing layer 32 has a mixture of at least two polymer materials 311 and 312 respectively having different degrees of crystallinity from each other. Here, it is assumed that the first polymer material 311 has a higher degree of crystallinity than that of the second polymer material 312. A main feature of the Second manner [II-2] here is that the weight ratio of the second polymer material, relative to the first polymer material, increases from one end R3 of the gas diffusion layer, corresponding to an inlet of the gas flow channel, to the other end L3 of the gas diffusion layer, corresponding to an outlet of the gas flow channel, so that the total degree of crystallinity decreases from the one end R3 to the other end L3.

A structure of a polymer electrolyte fuel cell made by using the gas diffusion electrode according to the present Second manner [II-2] here can be illustrated by the same FIG. 15 as used for describing the First manner [II-1] above. Accordingly, description of its further details is omitted here, but it is added that the end R3 shown in FIG. 13 is positioned at an inlet side of the oxidant gas, while the end L3 shown in FIG. 13 is positioned at an outlet side of the oxidant gas.

Owing to the structure as described above, the whole region of the MEA from the end R3 to the end L3 can be controlled to have a uniform water distribution. This can more specifically be described as follows. At the outlet side of the oxidant gas in comparison with the inlet side of the oxidant gas, the electrically conductive polymer-containing layer or gas diffusion layer has a larger amount of the polymer material having the lower degree of crystallinity, namely larger amount of amorphous portions. Since osmosis or permeation of water in the gas diffusion layer is caused by water absorption and water diffusion therein with the aid of amorphous portions of the polymer material in the gas diffusion layer, the amount of permeability, i.e. the amount of water permeated through the gas diffusion layer, gets larger at portions thereof having a larger amount of amorphous portions of polymer material, that is the outlet side of the oxidant gas.

Accordingly, it becomes possible that water at the outlet side of the oxidant gas is more readily brought to or to the vicinity of the gas flow channel of the separator plate along the surface of the gas diffusion layer, and can be more readily exhausted thereby to outside the cell together with the oxidant gas.

At the inlet side of the oxidant gas in comparison with the outlet side of the oxidant gas, on the other hand, the amount of polymer material having the lower degree of crystallinity is smaller, so that the amount of permeability, i.e. the amount of permeated water there, gets smaller, whereby water is more likely to be retained inside the cell.

Examples of polymer materials usable here for the present Second manner [II-2] are polyvinyl fluoride, polyethylene, polypropylene, polystyrene, polyethylene terephthalate, polyvinyl chloride, polyacrylonitrile, ethyl cellulose, and the like. From among these polymer materials, at least two polymer materials, either with different names or same names, having different degrees of crystallinity can be readily selected for the purpose of the present Second manner [II-2].

<II-3. Third Manner>

Figure 14:
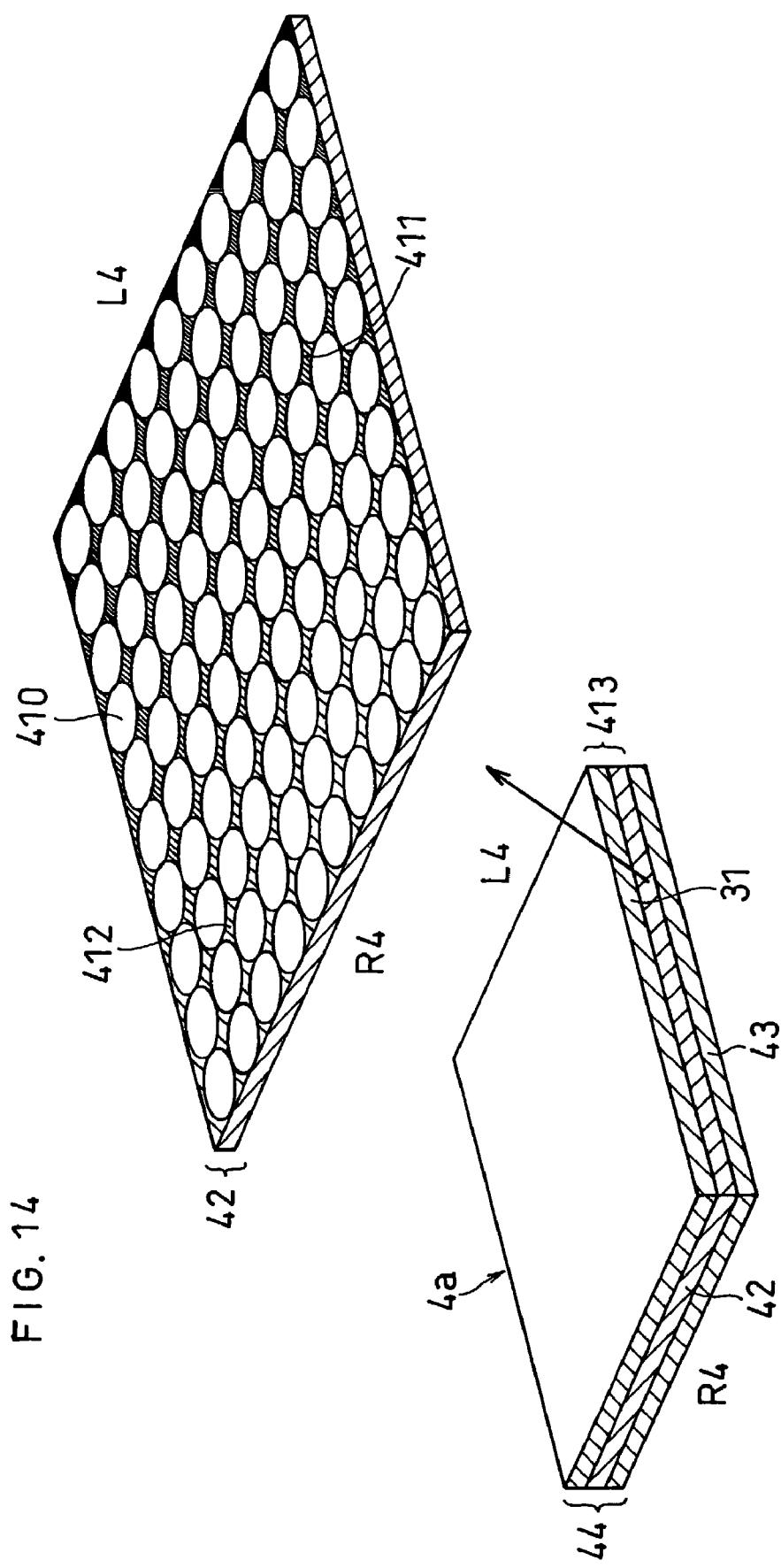
FIG. 14 is an oblique view, partially in cross-section, of a gas diffusion electrode and a gas diffusion layer in EXAMPLE II-3 according to Mode [II], schematically showing its structure.

FIG. 14 is an oblique view, partially in cross-section, of a gas diffusion layer and a gas diffusion electrode 4a using the gas diffusion layer according to a third manner (Third manner [II-3] hereafter) of Mode [II] of the present invention, seen from the gas diffusion layer side, schematically showing its structure.

As shown therein, a gas diffusion layer 413 comprises a porous supporting body 41, preferably of carbon made of carbon fibers, and an electrically conductive polymer-containing layer 42 being provided on a surface of the porous supporting body 41 and comprising an electrically conductive carbon powder or particles 410 and at least two polymer materials 411 and 412. A part of the electrically conductive polymer-containing layer 42 is buried in the porous supporting body 41, although not shown in FIG. 14. On the surface of the electrically conductive polymer-containing layer 42 of the gas diffusion layer 413, a catalyst layer 43 comprising an electrically conductive carbon powder or particles carrying platinum on the surface thereof is provided, thereby to form a gas diffusion electrode 44.

The electrically conductive polymer-containing layer 42 has a mixture of at least two polymer materials 411 and 412 respectively having different coefficients of moisture permeability from each other. Here, it is assumed that the first polymer material 411 has a lower coefficient of moisture permeability than that of the second polymer material 412. A main feature of the Third manner [II-3] here is that the weight ratio of the second polymer material increases, relative to the first polymer material, from one end R4 of the gas diffusion layer, corresponding to an inlet of the gas flow channel, to the other end L4 of the gas diffusion layer corresponding to an outlet of the gas flow channel, so that the total coefficient of moisture permeability increases from the one end R4 to the other end L4.

A structure of a polymer electrolyte fuel cell made by using the gas diffusion electrode according to the present Third manner [II-3] here can be illustrated by the same FIG. 15 as used for describing the First manner [II-1] above. Accordingly, description of its further details is omitted here, but it is added that the end R4 shown in FIG. 14 is positioned at an inlet side of the oxidant gas, while the end L4 shown in FIG. 14 is positioned at an outlet side of the oxidant gas.

Owing to the structure as described above, the whole region of the MEA from the end R4 to the end L4 can be controlled to have a uniform water distribution. More specifically, in a gas diffusion layer of the oxidant gas side or oxidant gas diffusion electrode side, in which uniform water control is considered to be difficult because of the water generated by cell reaction, it becomes possible to skillfully perform uniform water control by introducing graduation of the coefficient of moisture permeability.

At the outlet side of the oxidant gas in comparison with the inlet side of the oxidant gas, the gas diffusion layer has a larger amount of the polymer material having a higher coefficient of moisture permeability, so that the amount of permeability there can get larger at the outlet side. Accordingly, it becomes possible that water at the outlet side of the oxidant gas is more readily brought to or to the vicinity of the gas flow channel of the separator plate along the surface of the gas diffusion layer, and can be more readily exhausted thereby to outside the cell together with the oxidant gas.

At the inlet side of the oxidant gas in comparison with the outlet side of the oxidant gas, on the other hand, the amount of permeability there gets smaller, because the electrically conductive polymer-containing layer of the gas diffusion layer has a smaller amount of the polymer material having a higher coefficient of moisture permeability. Accordingly, water there is less readily brought toward the gas flow channel of the separator plate, whereby water is more likely to be retained there inside the cell.

Examples of combinations of (a) polymer material having a lower coefficient of moisture permeability with (b) polymer material having a higher coefficient of moisture permeability are: (a) PTFE with (b) polyimide; (a) PTFE with (b) polyvinyl chloride; (a) PTFE with (b) cellulose acetate; (a) polyethylene with (b) polyimide; (a) polyethylene with (b) polyvinyl chloride; (a) polyethylene with (b) cellulose acetate; (a) polypropylene with (b) polyimide; (a) polypropylene with (b) polyvinyl chloride; (a) polypropylene with (b) cellulose acetate, and the like.

Regarding kinds of materials for the porous supporting carbon bodies in the Mode [II] of the present invention, typically carbon papers can be used therefor, and are used in the following EXAMPLEs. However, other carbon unwoven fabrics and carbon cloths can also be used to achieve the objects of the present invention.

According to the First, Second and Third manners [II-1], [II-2] and [II-3] of Mode [II] of the present invention, the whole region of an MEA from one end to the other end can be controlled to have a uniform water distribution, whereby a polymer electrolyte fuel cell generating a stable voltage for a long period can be realized. This is because, due to the operational principles as described above, the water exhaustion at the outlet side of the oxidant gas diffusion electrode or cathode electrode is promoted, and the water permeation at the inlet side thereof is suppressed, whereby the polymer electrolyte membrane in the MEA can be prevented from both overly drying and flooding, so that the cell voltages can be prevented from overly decreasing.

Hereinafter, the Mode [II] of the present invention will more specifically be described in the following EXAMPLES [II].

EXAMPLES [II]

Example II-1-1

A. Production of Gas Diffusion Electrode

Acetylene black (AB hereafter) having an average particle size of 3 μm was heated in air at 400° C. for 10 hours in order to subject AB to air oxidation (the thus air-oxidized AB being hereafter referred to as ABO1). Amounts of acidic function group in AB and ABO1, respectively, were measured by use of chemical composition analysis based on volatile constituents. This volatile constituent-based chemical composition analysis is a method, which utilizes the phenomena that when a carbon material having acidic function group on the surface thereof is heated in vacuum at about 1,000° C., then the acidic function group is desorbed from the carbon material in the form of carbon dioxide, carbon monoxide, hydrogen and methane, and which subjects the desorbed gas composition to quantitative analysis, thereby to chemically and quantitatively analyze the amount of acidic function group being present on the surface of the carbon material. (See Carbon Black Handbook, Version 3, edited by Carbon Black Association, Japan).

The amounts of acidic function group of AB and ABO1 used in the present EXAMPLE, as measured, were $4.1 \times 10^{-4}$ mol/g and $9.8 \times 10^{-4}$ mol/g, respectively, whereby the air-oxidized carbon powder was found to have a larger amount of acidic function group than that of the original carbon powder.

Next, 10 g of AB was mixed with 2 g of a liquid dispersion of PTFE (product of Daikin Industries, Ltd.: D-1) containing PTFE as a main ingredient, thereby to prepare a liquid dispersion of the fluorocarbon resin solution having AB dispersed therein (Dispersion e1 hereafter). Likewise, 10 g of ABO1 was mixed with 2 g of the liquid dispersion of PTFE (product of Daikin Industries, Ltd.: D-1) containing PTFE as a main ingredient, thereby to prepare a liquid dispersion of the fluorocarbon resin solution having ABO1 dispersed therein (Dispersion f1 hereafter). By mixing Dispersion e1 and Dispersion f1 in ten different mixing ratios in weight, ten different liquid dispersions d1, d2, . . . d10 were prepared, respectively having the weight ratios of Dispersion e1: Dispersion f1 of 9:1, 8:2, 7:3, 6:4, 5:5, 4:6, 3:7, 2:8, 1:9 and 0:10.

Next, a carbon paper (product of Toray Industries, Inc.: TGP-H-060) having a length of 30 cm, width of 15 cm and thickness of 180 μm was prepared as a porous supporting carbon body, and the liquid dispersions were screen-printed on the carbon paper in a manner as described in the following with reference to FIG. 18. Referring to FIG. 18, a mask 53 having an opening 52 was placed over the carbon paper 51 with supporting bars 54 therebetween. On an upper portion of the mask 53, ten drops of liquid dispersions d1, d2, . . . d10 were equidistantly placed from R2 end to L2 end (as corresponding to the R2 end and the L2 end as shown in FIG. 11) so as to arrange the amounts of Dispersion f1 in the ten drops to increment from R2 end to L2 end, and to form ten strips of the liquid dispersion layers respectively having the same width, by being screen-printed, to cover the carbon paper from the R2 end to the L2 end by the ten strips. The ten drops were screen-printed on the carbon paper in the above described manner, and the carbon paper with the screen-printed layer of the ten strips, for an electrically conductive polymer-containing layer, was fired at 350° C., thereby to obtain a gas diffusion layer having an electrically conductive polymer-containing layer formed on the carbon paper thereof (the thus obtained gas diffusion layer made of the carbon paper and the electrically conductive polymer-containing layer being hereafter referred to as Gas diffusion layer g1).

The R2 portion of the thus obtained Gas diffusion layer g1 corresponding to the first half, i.e. 15 cm, portion of the carbon paper at one end thereof, and the L2 portion of Gas diffusion g1 corresponding to the second half, i.e. remaining 15 cm, portion of the carbon paper at the other end thereof were measured with respect to its water permeability in terms of amount of permeability on the basis of the weighting method according to the example defined by Japanese Industrial Standards (JIS) Z0208.

According to the weighting method of JISZ0208, a first atmosphere of air having a humidity of 90% and a second atmosphere of dry air are partitioned by a test sheet to be measured, and the weight of moisture permeated from the first atmosphere to the second atmosphere per 1 $m^2$ of the test sheet during 24 hours of the test is measured. The thus measured weight of moisture, i.e. total weight of water during the 24 hour period per 1 $m^2$, is the amount of permeability according to JISZ0209. According to the present EXAMPLES, a 90% humidity air and dry air both kept at 40° C. were partitioned by each diffusion layer, to be measured, having a surface area of 15 $cm^2$, and the permeated water in total during 24 hour period was measured. Each measured amount of permeability for each diffusion layer, to be measured, was converted by calculation in terms of 1 $m^2$.

The amounts of permeability in the case of Gas diffusion layer g1, as measured, according to the above definition were $0.8 \times 10^4$ $g/m^2 \cdot 24$ hr and $1.8 \times 10^4$ $g/m^2 \cdot 24$ hr, respectively, with respect the R2 portion and the L2 portion. The amount of permeability at the R2 portion was thus found to be smaller than that at the L2 portion.

Meanwhile, a carbon powder having particle sizes of not more than 3 μm was immersed in an aqueous solution of chloroplatinic acid, and then the chloroplatinic acid was subjected to reduction process so as to allow the carbon particles to carry platinum catalyst on the surfaces thereof, with the weight ratio of the carbon powder to the platinum being 1:1. The thus prepared carbon powder was dispersed in an alcohol solution of a polymer electrolyte, thereby to make a slurry. The thus made slurry was uniformly coated, as a catalyst layer, on one surface of the electrically conductive polymer-containing layer of Gas diffusion layer g1, thereby to make a gas diffusion electrode (the thus made gas diffusion electrode being hereafter referred to as Gas diffusion electrode h1).

On the other hand, a further gas diffusion layer was made in the same manner as described above for making Gas diffusion layer g1, except that here the liquid dispersion to be coated on the surface of the carbon paper was Dispersion e1 alone without using Dispersion f1 (the thus made gas diffusion layer being hereafter referred to as Gas diffusion layer i). The amount of permeability in the case of Gas diffusion layer i was uniformly $0.8 \times 10^4$ $g/m^2 \cdot 24$ hr from R2 end to L2 end (as corresponding to the R2 end and the L2 end as shown in FIG. 12). Thereafter, a catalyst layer was formed on one surface of the electrically conductive polymer-containing layer on Gas diffusion layer i in the same manner as that used for making Gas diffusion electrode h1 above, thereby to make a further gas diffusion electrode (the thus made gas diffusion electrode being hereafter referred to as Gas diffusion electrode j).

B. Production of Polymer Electrolyte Fuel Cell

Gas diffusion electrode h1 and Gas diffusion electrode j having the same size as that of Gas diffusion electrode h1 were prepared. Further, a polymer electrolyte membrane (product of DuPont Company: Nafion 117) having an outer dimension one size larger than that of Gas diffusion electrodes j and h1 was prepared. The thus prepared polymer electrolyte membrane was sandwiched by Gas diffusion layers j and h1 in a manner that the respective catalyst layers faced the electrolyte membrane, and was provided with a silicone rubber gasket having a thickness of 250 μm positioned for gas sealing, and was then hot-pressed at 130° C. for 5 minutes, thereby to make an MEA.

The thus made MEA was sandwiched by a pair of separator plates to form a unit cell. By using additional MEAs and separator plates and alternately stacking them on the above made unit cell, a polymer electrolyte fuel cell according to the present EXAMPLE having a cell stack of four unit cells was made. Each of the separator plates, as used, had a thickness of 4 mm and was made of an airtight carbon material. Each of such separator plates had, on each surface thereof to contact the each gas diffusion layer, a gas flow channel having a width of 2 mm and a depth of 1 mm, which was formed by cutting the separator plate. The cell stack was provided with a metal end plate made of SUS 304 on each of the both ends thereof, and was fixed to be a polymer electrolyte fuel cell.

In making the fuel cell above, the R2 portion and the L2 portion were positioned to correspond to the inlet side and outlet side of the gas flow channel of each separator plate. Each gas flow channel, facing Gas diffusion electrode h1, of each separator plate was supplied with air to flow from the inlet to the outlet thereof at an oxygen utilization rate of 40%. Also, each gas flow channel, facing Gas diffusion electrode j, of each separator plate was supplied with hydrogen to flow from the inlet to the outlet thereof at a hydrogen utilization rate of 70%. Under such conditions, the polymer electrolyte fuel cell according to the present EXAMPLE was operated with a hydrogen humidifying bubbler, an air humidifying bubbler and the cell being maintained at temperatures of 85° C., 65° C. and 75° C., respectively. Consequently, the polymer electrolyte fuel cell according to the present EXAMPLE generated a voltage of 2.8 V, and maintained the initial voltage for 3,000 hours or more after the start of the cell operation, showing stable operation. The reason therefor is that the electrolyte membrane in the polymer electrolyte fuel cell according to the present EXAMPLE was kept at an appropriate wet condition, while excessive water generated therein was quickly and safely exhausted to outside of the cell.

Example II-1-2

A gas diffusion layer according to the present EXAMPLE (such gas diffusion layer being hereafter referred to as Gas diffusion layer g2) was made in the same manner as that employed for making Gas diffusion layer g1 according to EXAMPLE II-1-1 above, except that according to the present EXAMPLE, the oxidized acetylene black as prepared in EXAMPLE II-1-1 was differently prepared as follows.

According to EXAMPLE II-1-1, the heating period for heating the acetylene black AB having an average particle size of 3 μm at 400° C. in air to prepare ABO1 was 10 hours, whereas according to the present EXAMPLE, the heating period was changed and shortened to 5 hours, thereby to prepare an air-oxidized AB (the thus prepared air-oxidized AB being hereafter referred to as ABO2). The amount of acidic function group of the thus prepared ABO2 was measured by using the volatile constituent-based chemical composition analysis as described above in EXAMPLE II-1-1, and was found to be $7.2 \times 10^{-4}$ mol/g.

Thereafter, in a manner similar to that described in EXAMPLE II-1-1, a liquid dispersion of 2 g of the fluorocarbon resin solution having 10 g of the ABO2 dispersed therein (such liquid dispersion being hereafter referred to as Dispersion f2) was prepared. Further, by mixing Dispersion e1 and Dispersion f2 in ten different mixing ratios in weight, ten different liquid dispersions were prepared, respectively having the weight ratios of Dispersion e1: Dispersion f2 of 9:1, 8:2, 7:3, 6:4, 5:5, 4:6, 3:7, 2:8, 1:9 and 0:10. Subsequently, a screen-printing process and a firing process at 350° C. were carried out in the same manner as in EXAMPLE II-1-1, thereby to make Gas diffusion layer g2.

The amounts of permeability in the case of Gas diffusion layer g2 were measured according to the weighting method of JISZ0208 as described above with respect to the R2 portion (first half portion) and the L2 portion (second half portion) thereof, which were found thereby to be $0.8 \times 10^4$ $g/m^2 \cdot 24$ hr and $1.8 \times 10^4$ $g/m^2 \cdot 24$ hr, respectively. In the words, the amount of permeability at the R2 portion according to the present EXAMPLE was the same as that in the case of EXAMPLE II-1-1, and the relative relation with respect to the amount of permeability between the R2 portion and the L2 portion according to the present EXAMPLE was the same as that in EXAMPLE II-1-1 in that the amount of permeability at the L2 portion was larger than that at the R2 portion. However, the amount of permeability at the L2 portion according to the present EXAMPLE was smaller than that in the case of EXAMPLE II-1-1. This is because although the amount of acidic function group at the L2 portion was larger than that at the R2 portion according to the present EXAMPLE, such amount of acidic function group at L2 portion according to the present EXAMPLE was smaller than that according to EXAMPLE II-1-1

By using the thus made Gas diffusion layer g2, a gas diffusion electrode according to the present EXAMPLE (Gas diffusion electrode h2 hereafter) was made in the same manner as that employed for making Gas diffusion electrode h1 in EXAMPLE II-1-1. A polymer electrolyte fuel cell according to the present EXAMPLE was made by using Gas diffusion electrode h2 and Gas diffusion electrode j in the same manner as employed for making the polymer electrolyte fuel cell according to EXAMPLE II-1-1.

The characteristics of the polymer electrolyte fuel cell according to the present EXAMPLE were measured under the same conditions as used in EXAMPLE II-1-1. More specifically, the fuel cell according to the present EXAMPLE was operated under the same conditions as described above in EXAMPLE II-1-1 under the same arrangements that the R2 portion and the L2 portion were arranged to correspond to the inlet and the outlet of the gas flow channel, and that Gas diffusion electrode h2 and Gas diffusion electrode j were supplied with air and hydrogen, respectively.

Consequently, the polymer electrolyte fuel cell according to the present EXAMPLE generated a voltage of 2.8 V, and maintained the initial voltage for 3,000 hours or more after the start of the cell operation, showing stable operation. The reason therefor is that the electrolyte membrane in the polymer electrolyte fuel cell according to the present EXAMPLE was kept at an appropriate wet condition, while excessive water generated therein was quickly and safely exhausted to outside of the cell.

Example II-1-3

A gas diffusion layer according to the present EXAMPLE (such gas diffusion layer being hereafter referred to as Gas diffusion layer g3) was made in the same manner as that employed for making Gas diffusion layer g1 according to EXAMPLE II-1-1 above, except that according to the present EXAMPLE, the oxidized acetylene black as prepared in EXAMPLE II-1-1 was differently prepared as follows.

According to EXAMPLE II-1-1, the heating temperature and the heating period for heating the acetylene black AB having an average particle size of 3 μm in air to prepare ABO1 were 400° C. and 10 hours, respectively, whereas according to the present EXAMPLE, the heating temperature was changed to 200° C. and heating period was changed and shortened to 5 hours, thereby to prepare an air-oxidized AB (the thus prepared air-oxidized AB being hereafter referred to as ABO3). The amount of acidic function group of the thus prepared ABO3 was measured by using the volatile constituent-based chemical composition analysis as described above in EXAMPLE II-1-1, and was found to be $6.3 \times 10^{-4}$ mol/g.

Thereafter, in a manner similar to that described in EXAMPLE II-1-1 and EXAMPLE II-1-2 (a detailed description of the manner being thus omitted here for the purpose of a simpler description), a liquid dispersion according to the present EXAMPLE (such liquid dispersion being hereafter referred to as Dispersion f3) was prepared in place of Dispersion f1 or f2. Further, in a manner similar to that described in EXAMPLE II-1-1 and EXAMPLE II-1-2, by mixing Dispersion e1 and Dispersion f3 in ten different mixing ratios in weight, ten different liquid dispersions were prepared, and then the screen-printing followed by firing was carried out, Gas diffusion layer g3 according to the present EXAMPLE was made in place of Gas diffusion layer g1 or g2.

The amounts of permeability in the case of Gas diffusion layer g3 were measured according to the weighting method of JISZ0208 as described above with respect to the R2 portion (first half portion) and the L2 portion (second half portion) thereof, which were found thereby to be $0.8 \times 10^4$ $g/m^2 \cdot 24$ hr and $1.8 \times 10^4$ $g/m^2 \cdot 24$ hr, respectively. In the words, the amount of permeability at the R2 portion according to the present EXAMPLE was the same as that in the case of EXAMPLE II-1-1 and EXAMPLE II-1-2, and the relative relation with respect to the amount of permeability between the R2 portion and the L2 portion according to the present EXAMPLE was the same as that in EXAMPLE II-1-1 and EXAMPLE II-1-2 in that the amount of permeability at the L2 portion was larger than that at the R2 portion. However, the amount of permeability at the L2 portion according to the present EXAMPLE was even smaller than that in the case of EXAMPLE II-1-2. This is because although the amount of acidic function group at the L2 portion was larger than that at the R2 portion according to the present EXAMPLE, such amount of acidic function group at the L2 portion according to the present EXAMPLE was even smaller than that according to EXAMPLE II-1-2.

By using the thus made Gas diffusion layer g3, a gas diffusion electrode according to the present EXAMPLE (Gas diffusion electrode h3 hereafter) was made in the same manner as that employed for making Gas diffusion electrode h1 in EXAMPLE II-1-1. A polymer electrolyte fuel cell according to the present EXAMPLE was made by using Gas diffusion electrode h3 and Gas diffusion electrode j in the same manner as employed for making the polymer electrolyte fuel cell according to EXAMPLE II-1-1.

The characteristics of the polymer electrolyte fuel cell according to the present EXAMPLE were measured under the same conditions as used in EXAMPLE II-1-1. More specifically, the fuel cell according to the present EXAMPLE was operated under the same conditions as described above in EXAMPLE II-1-1 under the same arrangements that the R2 portion and the L2 portion were arranged to correspond to the inlet and the outlet of the gas flow channel, and that Gas diffusion electrode h3 and Gas diffusion electrode j were supplied with air and hydrogen, respectively.

Consequently, the polymer electrolyte fuel cell according to the present EXAMPLE generated a voltage of 2.8 V, and maintained the initial voltage for 3,000 hours or more after the start of the cell operation, showing stable operation. The reason therefor is that the electrolyte membrane in the polymer electrolyte fuel cell according to the present EXAMPLE was kept at an appropriate wet condition, while excessive water generated therein was quickly and safely exhausted to outside of the cell.

Example II-1-4

A gas diffusion layer according to the present EXAMPLE (such gas diffusion layer being hereafter referred to as Gas diffusion layer g4) was made in the same manner as that employed for making Gas diffusion layer g1 according to EXAMPLE II-1-1 above, except that according to the present EXAMPLE, the acetylene black AB and the oxidized acetylene black ABO1 as prepared in EXAMPLE II-1-1 were respectively substituted by a graphitized black (GB hereafter) having an average particle size of 3 μm and a furnace black (FB hereafter) having an average particle size of 3 μm.

The amounts of acidic function group of the thus prepared GB and FB were measured by using the volatile constituent-based chemical composition analysis as described above in EXAMPLE II-1-1, and were found to be $0.2 \times 10^{-4}$ mol/g and $5.7 \times 10^{-4}$ mol/g, respectively.

Thereafter, in a manner similar to that described in EXAMPLE II-1-1, EXAMPLE II-1-2 and EXAMPLE II-1-3 (a detailed description of the manner being thus omitted here for the purpose of a simpler description), a first liquid dispersion according to the present EXAMPLE (such liquid dispersion being hereafter referred to as Dispersion e2) was prepared in place of Dispersion e1, and a second liquid dispersion according to the present EXAMPLE (such liquid dispersion being hereafter referred to as Dispersion f4) was prepared in place of Dispersion f1, f2 or f3, thereby to substitute the combination of GB plus FB for each of the combinations of AB plus ABO1, AB plus ABO2, and AB plus ABO3 according to EXAMPLES II-1-1, II-1-2 and II-1-3, respectively. Further, in a manner similar to that described in EXAMPLE II-1-1, EXAMPLE II-1-2 and EXAMPLE II-1-3, by mixing Dispersion e2 and Dispersion f4 in ten different mixing ratios in weight, ten different liquid dispersions were prepared, and then the screen-printing followed by firing was carried out, a Gas diffusion layer g4 according to the present EXAMPLE was made in place of Gas diffusion layer g1, g2 or g3.

The amounts of permeability in the case of Gas diffusion layer g4 were measured according to the weighting method of JISZ0208 as described above with respect to the R2 portion (first half portion) and the L2 portion (second half portion) thereof, which were found thereby to be $0.1 \times 10^4$ g/m$^2 \cdot$24 hr and $0.9 \times 10^4$ g/m$^2 \cdot$24 hr, respectively. In the words, the amount of permeability at the R2 portion according to the present EXAMPLE was smaller than that in the case of EXAMPLE II-1-1 by almost one order of magnitude, and the amount of permeability at the L2 portion according to the present EXAMPLE was half of that in the case of EXAMPLE II-1-1, while the relative relation with respect to the amount of permeability between the R2 portion and the L2 portion according to the present EXAMPLE was the same as that in EXAMPLE II-1-1, EXAMPLE II-1-2 and EXAMPLE II-1-3 in that the amount of permeability at the L2 portion was larger than that at the R2 portion. It is to be noted that the amount of permeability at the L2 portion according to the present EXAMPLE was even smaller than that any corresponding one in the case of the above EXAMPLEs, but that the difference in the amount of permeability between the R2 portion and the L2 portion according to the present EXAMPLE was larger than that in the case of any corresponding one of the above EXAMPLEs. This is because the amounts of acidic function group at the R2 portion and the L2 portion were respectively smaller than those at the R2 portion and the L2 portion according to each of the above EXAMPLEs, while the difference in the amount of acidic function group between the R2 portion and the L2 portion according to the present EXAMPLE was larger than that in the case of any corresponding one of the above EXAMPLEs.

By using the thus made Gas diffusion layer g4, a gas diffusion electrode according to the present EXAMPLE (Gas diffusion electrode h4 hereafter) was made in the same manner as that employed for making Gas diffusion electrode h1 in EXAMPLE II-1-1. A polymer electrolyte fuel cell according to the present EXAMPLE was made by using Gas diffusion electrode h4 and Gas diffusion electrode j in the same manner as employed for making the polymer electrolyte fuel cell according to EXAMPLE II-1-1.

The characteristics of the polymer electrolyte fuel cell according to the present EXAMPLE were measured under the same conditions as used in EXAMPLE II-1-1. More specifically, the fuel cell according to the present EXAMPLE was operated under the same conditions as described above in EXAMPLE II-1-1 under the same arrangements that the R2 portion and the L2 portion were arranged to correspond to the inlet and the outlet of the gas flow channel, and that Gas diffusion electrode h4 and Gas diffusion electrode j were supplied with air and hydrogen, respectively.

Consequently, the polymer electrolyte fuel cell according to the present EXAMPLE generated a voltage of 2.8 V, and maintained the initial voltage for 3,000 hours or more after the start of the cell operation, showing stable operation. The reason therefor is that the electrolyte membrane in the polymer electrolyte fuel cell according to the present EXAMPLE was kept at an appropriate wet condition, while excessive water generated therein was quickly and safely exhausted to outside of the cell.

It is to be noted that in the above four EXAMPLES II-1-1 to II-1-4, two kinds of materials having different amounts of acidic function group were used to be mixed, and drops of ten different mixing rations in weight were prepared and used. However, it was separately confirmed that the number of drops or number of different mixing ratios in weight could be other than ten, and also that the number of kinds of the materials having respectively different amounts of acidic function group could be three or more. More specifically, it was confirmed that when plural kinds of materials having different amounts of acidic function group were selected from among e.g. those having $0.2 \times 10^{-4}$ mol/g to $9.8 \times 10^{-4}$ mol/g in the case of the exemplified materials, and were mixed in plural mixtures so that the amount of acidic function group increased, preferably gradually, from the R2 end portion to the L2 end portion, then operable results could be obtained as in the above four EXAMPLES II-1-1 to II-1-4.

Example II-2-1

A. Production of Gas Diffusion Electrode

First of all, 10 g of acetylene black AB as used in EXAMPLE II-1-1 was mixed with 2 g of a liquid dispersion of PTFE (product of Daikin Industries, Ltd.: Lubron) containing PTFE as a main ingredient, which PTFE had a molecular weight different from and a degree of crystallinity lower than that of the PTFE contained in the liquid dispersion of PTFE (product of Daikin Industries, Ltd.: D-1) as used in EXAMPLE II-1-1. Thereby, a liquid dispersion of the fluorocarbon resin solution having AB dispersed there was prepared (the thus prepared liquid dispersion being hereafter referred to as Dispersion k1).

By mixing Dispersion e1, as prepared in EXAMPLE II-1-1, with the thus prepared Dispersion k1 in ten different mixing ratios in weight, ten different liquid dispersions were prepared, respectively having the weight ratios of Dispersion e1: Dispersion k1 of 9:1, 8:2, 7:3, 6:4, 5:5, 4:6, 3:7, 2:8, 1:9 and 0:10.

Here, the degree of crystallinity of a material is a volume % of crystallized portions to the total volume of crystallized portions plus amorphous portions of the material, and can be measured by (the) X-ray measuring method. The degree of PTFE, as measured, in the liquid dispersion D-1 of PTFE was 80%, while that in the Lubron solution was 40%.

Next, a carbon paper (product of Toray Industries, Inc.: TGP-H-060) having a length of 30 cm, width of 15 cm and thickness of 180 μm was prepared as a porous supporting carbon body, and the liquid dispersions were screen-printed on the carbon paper in a manner as described in EXAMPLE II-1-1 with reference to FIG. 18, in a manner that ten drops of the above prepared liquid dispersions of the ten different mixtures, respectively, of Dispersion e1 and Dispersion k1 were arranged so as to arrange the amounts of Dispersion k1 in the ten drops to increment from one end (R3 end here as corresponding to R3 shown in FIG. 13) and the other end (L3 end here as also corresponding to L3 shown in FIG. 13), thereby to form ten strips of the liquid dispersion layers respectively having the same width, by being screen-printed, to cover the carbon paper from the R3 end to the L3 end by the ten strips. The ten drops were screen-printed on the carbon paper in the above described manner, and the carbon paper with the screen-printed layer of the ten strips, for an electrically conductive polymer-containing layer, was fired at 350° C., thereby to obtain a gas diffusion layer having an electrically conductive polymer-containing layer formed on the carbon paper thereof (the thus obtained gas diffusion layer made of the carbon paper and the electrically conductive polymer-containing layer being hereafter referred to as Gas diffusion layer m1).

The R3 portion of the thus obtained Gas diffusion layer m1 corresponding to the first half, i.e. 15 cm, portion of the carbon paper at one end thereof, and the L3 portion of Gas diffusion m1 corresponding to the second half, i.e. remaining 15 cm, portion of the carbon paper at the other end thereof were measured with respect to its water permeability in terms of amount of permeability on the basis of the weighting method according to the example defined by JISZ0208, as already described in EXAMPLE II-1-1 above.

The amounts of permeability in the case of Gas diffusion layer m1, as measured, according to the above definition were $0.8 \times 10^4$ g/m$^2 \cdot$24 hr and $1.8 \times 10^4$ g/m$^2 \cdot$24 hr, respectively, with respect the R3 portion and the L3 portion. The amount of permeability at the R3 portion was thus found to be smaller than that at the L3 portion.

Meanwhile, a carbon powder having particle sizes of not more than 3 μm was immersed in an aqueous solution of chloroplatinic acid, and then the chloroplatinic acid was subjected to reduction process so as to allow the carbon particles to carry platinum catalyst on the surfaces thereof, with the weight ratio of the carbon powder to the platinum being 1:1. The thus prepared carbon powder was dispersed in an alcohol solution of a polymer electrolyte, thereby to make a slurry. The thus made slurry was uniformly coated, as a catalyst layer, on one surface of the electrically conductive polymer-containing layer on Gas diffusion layer m1, thereby to make a gas diffusion electrode (the thus made gas diffusion electrode being hereafter referred to as Gas diffusion electrode n1).

B. Production of Polymer Electrolyte Fuel Cell

Gas diffusion electrode n1 and Gas diffusion electrode j, as made in EXAMPLE II-1-1, having the same size as that of Gas diffusion electrode n1 were prepared. Further, a polymer electrolyte membrane (product of DuPont Company: Nafion 117) having an outer dimension one size larger than that of Gas diffusion electrodes j and n1 was prepared. The thus prepared polymer electrolyte membrane was sandwiched by Gas diffusion layers j and n1 in a manner that the respective catalyst layers faced the electrolyte membrane, and was provided with a silicone rubber gasket having a thickness of 250 μm positioned for gas sealing, and was then hot-pressed at 130° C. for 5 minutes, thereby to make an MEA.

The thus made MEA was sandwiched by a pair of separator plates to form a unit cell. By using additional MEAs and separator plates and alternately stacking them on the above made unit cell, a polymer electrolyte fuel cell according to the present EXAMPLE having a cell stack of four unit cells was made. Each of the separator plates, as used, had a thickness of 4 mm and was made of an airtight carbon material. Each of such separator plates had, on each surface thereof to contact the each gas diffusion layer, a gas flow channel having a width of 2 mm and a depth of 1 mm, which was formed by cutting the separator plate. The cell stack was provided with a metal end plate made of SUS 304 on each of the both ends thereof, and was fixed to be a polymer electrolyte fuel cell.

In making the fuel cell above, the R3 portion and the L3 portion were positioned to correspond to the inlet and outlet of the gas flow channel of each separator plate. Each gas flow channel, facing Gas diffusion electrode n1, of each separator plate was supplied with air to flow from the inlet to the outlet thereof at an oxygen utilization rate of 40%. Also, each gas flow channel, facing Gas diffusion electrode j, of each separator plate was supplied with hydrogen to flow from the inlet to the outlet thereof at a hydrogen utilization rate of 70%. Under such conditions, the polymer electrolyte fuel cell according to the present EXAMPLE was operated with a hydrogen humidifying bubbler, an air humidifying bubbler and the cell being maintained at temperatures of 85° C., 65° C. and 75° C., respectively. Consequently, the polymer electrolyte fuel cell according to the present EXAMPLE generated a voltage of 2.8 V, and maintained the initial voltage for 3,000 hours or more after the start of the cell operation, showing stable operation. The reason therefor is that the electrolyte membrane in the polymer electrolyte fuel cell according to the present EXAMPLE was kept at an appropriate wet condition, while excessive water generated therein was quickly and safely exhausted to outside of the cell.

Example II-2-2

A gas diffusion layer according to the present EXAMPLE (such gas diffusion layer being hereafter referred to as Gas diffusion layer m2) was made in the same manner as that employed for making Gas diffusion layer m1 according to EXAMPLE II-2-1 above, except that according to the present EXAMPLE, the fluorocarbon resin solutions as prepared in EXAMPLE II-2-1 were substituted by liquid dispersions as follows.

According to the present EXAMPLE, the liquid dispersion D-1 of PTFE, used for Dispersion e1 and having PTFE as a main ingredient, was substituted by a liquid dispersion of ethanol having a polypropylene dispersed therein, thereby to prepare a liquid dispersion having AB dispersed therein (the thus prepared liquid dispersion being hereafter referred to as Dispersion e3) in place of Dispersion e1, wherein the polypropylene, as used for Dispersion e3, had a degree of crystallinity of 80%, and the weight ratio of the polypropylene to ethanol in the liquid dispersion of the polypropylene and ethanol here was 20:80.

Also, the liquid dispersion Lubron of PTFE, used for Dispersion k1 and having PTFE as a main ingredient, was substituted by a liquid dispersion of ethanol having a further polypropylene dispersed therein, thereby to prepare a liquid dispersion having AB dispersed therein (the thus prepared liquid dispersion being hereafter referred to as Dispersion k2) in place of Dispersion k1, wherein the polypropylene, as used for Dispersion k2, had a degree of crystallinity of 40%, and the weight ratio of the polypropylene to ethanol in the liquid dispersion of the polypropylene and ethanol here was 20:80.

Thereafter, in a manner similar to that described in EXAMPLE II-2-1, by mixing Dispersion e3 and Dispersion k2 in ten different mixing ratios in weight, ten different liquid dispersions were prepared, respectively having the weight ratios of Dispersion e3: Dispersion k2 of 9:1, 8:2, 7:3, 6:4, 5:5, 4:6, 3:7, 2:8, 1:9 and 0:10. Subsequently, a screen-printing process and a firing process at 350° C. were carried out in the same manner as in EXAMPLE II-2-1, thereby to make Gas diffusion layer m2.

The amounts of permeability in the case of Gas diffusion layer m2 were measured according to the weighting method of JISZ0208 as described above in EXAMPLE II-1-1 and other EXAMPLEs with respect to the R3 portion (first half portion) and the L3 portion (second half portion) thereof, which were found thereby to be $0.8 \times 10^4$ g/m$^2$·24 hr and $1.8 \times 10^4$ g/m$^2$·24 hr, respectively. In the words, both the amounts of permeability at the R3 portion and the L3 portion according to the present EXAMPLE were the same as those in the case of EXAMPLE II-2-1, respectively. This is because the degrees of crystallinity at the R3 portion and the L3 portion according to the present EXAMPLE were the same as those in the case of EXAMPLE II-2-1, respectively.

By using the thus made Gas diffusion layer m2, a gas diffusion electrode according to the present EXAMPLE (Gas diffusion electrode n2 hereafter) was made in the same manner as that employed for making Gas diffusion electrode n1 in EXAMPLE II-2-1. A polymer electrolyte fuel cell according to the present EXAMPLE was made by using Gas diffusion electrode n2 and Gas diffusion electrode j in the same manner as employed for making the polymer electrolyte fuel cell according to EXAMPLE II-2-1.

The characteristics of the polymer electrolyte fuel cell according to the present EXAMPLE were measured under the same conditions as used in EXAMPLE II-2-1. More specifically, the fuel cell according to the present EXAMPLE was operated under the same conditions as described above in EXAMPLE II-2-1 under the same arrangements that the R3 portion and the L3 portion were arranged to correspond to the inlet and the outlet of the gas flow channel, and that Gas diffusion electrode n2 and Gas diffusion electrode j were supplied with air and hydrogen, respectively.

Consequently, the polymer electrolyte fuel cell according to the present EXAMPLE generated a voltage of 2.8 V, and maintained the initial voltage for 3,000 hours or more after the start of the cell operation, showing stable operation. The reason therefor is that the electrolyte membrane in the polymer electrolyte fuel cell according to the present EXAMPLE was kept at an appropriate wet condition, while excessive water generated therein was quickly and safely exhausted to outside of the cell.

Example II-2-3

A gas diffusion layer according to the present EXAMPLE (such gas diffusion layer being hereafter referred to as Gas diffusion layer m3) was made in the same manner as that employed for making Gas diffusion layer m1 according to EXAMPLE II-2-1 above, except that according to the present EXAMPLE, the fluorocarbon resin solutions as prepared in EXAMPLE II-2-1 were substituted by a liquid dispersion and an ethanol solution as follows.

According to the present EXAMPLE, the liquid dispersion D-1 of PTFE, used for Dispersion e1 and having PTFE as a main ingredient, was substituted by a liquid dispersion of ethanol having a polyethylene dispersed therein, thereby to prepare a liquid dispersion having AB dispersed therein (the thus prepared liquid dispersion being hereafter referred to as Dispersion e4) in place of Dispersion e1, wherein the polyethylene, as used for Dispersion e4, had a degree of crystallinity of 80%, and the weight ratio of the polyethylene to ethanol in the liquid dispersion of the polyethylene and ethanol here was 20:80.

Also, the liquid dispersion Lubron of PTFE, used for Dispersion k1 and having PTFE as a main ingredient, was substituted by an ethanol solution having an acrylonitrile dissolved therein, thereby to prepare a liquid dispersion having AB dispersed therein (the thus prepared liquid dispersion being hereafter referred to as Dispersion k3) in place of Dispersion k1, wherein the acrylonitrile, as used for Dispersion k3, had a degree of crystallinity of 30%, and the weight ratio of the acrylonitrile to ethanol in the solution of the acrylonitrile and ethanol here was 20:80.

Thereafter, in a manner similar to that described in EXAMPLE II-2-1, by mixing Dispersion e4 and Dispersion k3 in ten different mixing ratios in weight, ten different liquid dispersions were prepared, respectively having the weight ratios of Dispersion e4: Dispersion k3 of 9:1, 8:2, 7:3, 6:4, 5:5, 4:6, 3:7, 2:8, 1:9 and 0:10. Subsequently, a screen-printing process and a firing process at 350° C. were carried out in the same manner as in EXAMPLE II-2-1, thereby to make Gas diffusion layer m3, wherein the acrylonitrile having been present in the liquid dispersion layer after the screen-printing was present in Gas diffusion layer m3 in the form of polymer after the firing process.

The amounts of permeability in the case of Gas diffusion layer m3 were measured according to the weighting method of JISZ0208 as described above in EXAMPLE II-1-1 and other EXAMPLEs with respect to the R3 portion (first half portion) and the L3 portion (second half portion) thereof, which were found thereby to be $0.8 \times 10^4$ g/m$^2$·24 hr and $2.0 \times 10^4$ g/m$^2$·24 hr, respectively. In the words, the relation between the amounts of permeability at the R3 portion and the L3 portion according to the present EXAMPLE was the same as that in each of EXAMPLEs II-2-1 and II-2-2 in that the amount of permeability at the L3 portion is larger than that at the R3 portion. However, the amount of permeability at the L3 portion according to the present EXAMPLE was even larger than that in each of the cases of EXAMPLEs II-2-1 and II-2-2. This is because the degree of crystallinity at the L3 portion according to the present EXAMPLE was larger than that in each of the cases of EXAMPLEs II-2-1 and II-2-2.

By using the thus made Gas diffusion layer m3, a gas diffusion electrode according to the present EXAMPLE (Gas diffusion electrode n3 hereafter) was made in the same manner as that employed for making Gas diffusion electrode n1 in EXAMPLE II-2-1. A polymer electrolyte fuel cell according to the present EXAMPLE was made by using Gas diffusion electrode n3 and Gas diffusion electrode j in the same manner as employed for making the polymer electrolyte fuel cell according to EXAMPLE II-2-1.

The characteristics of the polymer electrolyte fuel cell according to the present EXAMPLE were measured under the same conditions as used in EXAMPLE II-2-1. More specifically, the fuel cell according to the present EXAMPLE was operated under the same conditions as described above in EXAMPLE II-2-1 under the same arrangements that the R3 portion and the L3 portion were arranged to correspond to the inlet and the outlet of the gas flow channel, and that Gas diffusion electrode n3 and Gas diffusion electrode j were supplied with air and hydrogen, respectively.

Consequently, the polymer electrolyte fuel cell according to the present EXAMPLE generated a voltage of 2.8 V, and maintained the initial voltage for 3,000 hours or more after the start of the cell operation, showing stable operation. The reason therefor is that the electrolyte membrane in the polymer electrolyte fuel cell according to the present EXAMPLE was kept at an appropriate wet condition, while excessive water generated therein was quickly and safely exhausted to outside of the cell.

Example II-2-4

A gas diffusion layer according to the present EXAMPLE (such gas diffusion layer being hereafter referred to as Gas diffusion layer m4) was made in the same manner as that employed for making Gas diffusion layer m1 according to EXAMPLE II-2-1 above, except that according to the present EXAMPLE, the two liquid dispersions of PTFE as prepared in EXAMPLE II-2-1 were substituted by a cresol solution and an ethanol solution, respectively, as follows.

According to the present EXAMPLE, the liquid dispersion D-1 of PTFE, used for Dispersion e1 and having PTFE as a main ingredient, was substituted by an m-cresol solution having polyethylene terephthalate dissolved therein, thereby to prepare a liquid dispersion having AB dispersed therein (the thus prepared liquid dispersion being hereafter referred to as Dispersion e5) in place of Dispersion e1, wherein the polyethylene terephthalate, as used for Dispersion e5, had a degree of crystallinity of 60%, and the weight ratio of the polyethylene terephthalate to m-cresol in the liquid dispersion of the polyethylene terephthalate and m-cresol here was 20:80.

Also, the liquid dispersion Lubron of PTFE, used for Dispersion k1 and having PTFE as a main ingredient, was substituted by an ethanol solution having a vinyl chloride dissolved therein, thereby to prepare a liquid dispersion having AB dispersed therein (the thus prepared liquid dispersion being hereafter referred to as Dispersion k4) in place of Dispersion k1, wherein the vinyl chloride, as used for Dispersion k4, had a degree of crystallinity of 10%, and the weight ratio of the vinyl chloride to ethanol in the solution of the vinyl chloride and ethanol here was 20:80.

Thereafter, in a manner similar to that described in EXAMPLE II-2-1, by mixing Dispersion e5 and Dispersion k4 in ten different mixing ratios in weight, ten different liquid dispersions were prepared, respectively having the weight ratios of Dispersion e5: Dispersion k4 of 9:1, 8:2, 7:3, 6:4, 5:5, 4:6, 3:7, 2:8, 1:9 and 0:10. Subsequently, a screen-printing process and a firing process at 350° C. were carried out in the same manner as in EXAMPLE II-2-1, thereby to make Gas diffusion layer m4, wherein the vinyl chloride having been present in the liquid dispersion layer after the screen-printing was present in Gas diffusion layer m4 in the form of polymer after the firing process.

The amounts of permeability in the case of Gas diffusion layer m4 were measured according to the weighting method of JISZ0208 as described above in EXAMPLE II-1-1 and other EXAMPLEs with respect to the R3 portion (first half portion) and the L3 portion (second half portion) thereof, which were found thereby to be $1.2 \times 10^4$ $g/m^2 \cdot 24$ hr and $2.8 \times 10^4$ $g/m^2 \cdot 24$ hr, respectively. In the words, the amounts of permeability at the R3 portion and the L3 portion according to the present EXAMPLE were both larger than those, respectively, in each of the cases of EXAMPLEs II-2-1, II-2-2 and II-2-3. Further, the difference in the amount of permeability between the R3 portion and the L3 portion was larger than that in each of the cases of EXAMPLEs II-2-1, II-2-2 and II-2-3. This is because the degrees of crystallinity at the R3 portion and the L3 portion according to the present EXAMPLE were larger than those, respectively, in each of the cases of EXAMPLEs II-2-1, II-2-2 and II-2-3, and because the difference in the degree of crystallinity between the R3 portion and the L3 portion was larger that that in each of the cases of EXAMPLEs II-2-1, II2-2 and II-2-3.

By using the thus made Gas diffusion layer m4, a gas diffusion electrode according to the present EXAMPLE (Gas diffusion electrode n4 hereafter) was made in the same manner as that employed for making Gas diffusion electrode n1 in EXAMPLE II-2-1. A polymer electrolyte fuel cell according to the present EXAMPLE was made by using Gas diffusion electrode n4 and Gas diffusion electrode j in the same manner as employed for making the polymer electrolyte fuel cell according to EXAMPLE II-2-1.

The characteristics of the polymer electrolyte fuel cell according to the present EXAMPLE were measured under the same conditions as used in EXAMPLE II-2-1. More specifically, the fuel cell according to the present EXAMPLE was operated under the same conditions as described above in EXAMPLE II-2-1 under the same arrangements that the R3 portion and the L3 portion were arranged to correspond to the inlet and the outlet of the gas flow channel, and that Gas diffusion electrode n4 and Gas diffusion electrode j were supplied with air and hydrogen, respectively.

Consequently, the polymer electrolyte fuel cell according to the present EXAMPLE generated a voltage of 2.8 V, and maintained the initial voltage for 3,000 hours or more after the start of the cell operation, showing stable operation. The reason therefor is that the electrolyte membrane in the polymer electrolyte fuel cell according to the present EXAMPLE was kept at an appropriate wet condition, while excessive water generated therein was quickly and safely exhausted to outside of the cell.

It is to be noted that in the above four EXAMPLES II-2-1 to II-2-4, two kinds of materials having different degrees of crystallinity were used to be mixed, and drops of ten different mixing rations in weight were prepared and used. However, it was separately confirmed that the number of drops or number of different mixing ratios in weight could be other than ten, and also that the number of kinds of the materials having respectively different degrees of crystallinity could be three or more. More specifically, it was confirmed that when plural kinds of materials having different degrees of crystallinity were selected from among e.g. those having 80% to 10% in the case of the exemplified materials, and were mixed in plural mixtures so that the degree of crystallinity increased, preferably gradually, from the R3 end portion to the L3 end portion, then operable results could be obtained as in the above four EXAMPLES II-2-1 to II-2-4.

Example II-3-1

A. Production of Gas Diffusion Electrode

First of all, 10 g of acetylene black AB as used in EXAMPLE II-1-1 was mixed with 2 g of an N-methyl-2-pyrolidone solution having dissolved therein a polyimide resin as a main ingredient (product of Japan Synthetic Rubber Co., Ltd.: JALS214) and having a coefficient of moisture permeability higher than that of the PTFE contained in the liquid dispersion of PTFE (product of Daikin Industries, Ltd.: D-1) as used in EXAMPLE II-1-1. Thereby, a liquid dispersion of the N-methyl-2-pyrolidone solution, having the polyimide resin as a main ingredient and having AB dispersed therein, was prepared (the thus prepared liquid dispersion being hereafter referred to as Dispersion p1).

By mixing Dispersion e1, as prepared in EXAMPLE II-1-1, with the thus prepared Dispersion p1 in ten different mixing ratios in weight, ten different liquid dispersions were prepared, respectively having the weight ratios of Dispersion e1: Dispersion p1 of 9:1, 8:2, 7:3, 6:4, 5:5, 4:6, 3:7, 2:8, 1:9 and 0:10.

Here, the coefficient of moisture permeability of a material is an amount of moisture to permeate through a unit area of the material per unit time period under a constant atmospheric pressure, and the definition according to Japanese Industrial Standard (JIS)-A9511 is used here therefor. The coefficient of moisture permeability of PTFE, as measured, in the liquid dispersion D-1 of PTFE or Dispersion e1 was 0.01 g/m$^2$·hr·mmHg, while that of the polyimide resin in the N-methyl-2-pyrolidone solution of Dispersion p1 was 0.04 g/m$^2$·hr·mmHg.

Next, a carbon paper (product of Toray Industries, Inc.: TGP-H-060) having a length of 30 cm, width of 15 cm and thickness of 180 μm was prepared as a porous supporting carbon body, and the liquid dispersions were screen-printed on the carbon paper in a manner as described in EXAMPLE II-1-1 with reference to FIG. 18, in a manner that ten drops of the above prepared liquid dispersions of the ten different mixtures, respectively, of Dispersion e1 and Dispersion p1 were arranged so as to arrange the amounts of Dispersion p1 in the ten drops to increment from one end (R4 end here as corresponding to R4 shown in FIG. 14) and the other end (L4 end here as also corresponding to L4 shown in FIG. 14), thereby to form ten strips of the liquid dispersion layers respectively having the same width, by being screen-printed, to cover the carbon paper from the R4 end to the L4 end by the ten strips. The ten drops were screen-printed on the carbon paper in the above described manner, and the carbon paper with the screen-printed layer of the ten strips, for an electrically conductive polymer-containing layer, was fired at 350° C., thereby to obtain a gas diffusion layer having an electrically conductive polymer-containing layer formed on the carbon paper thereof (the thus obtained gas diffusion layer made of the carbon paper and the electrically conductive polymer-containing layer being hereafter referred to as Gas diffusion layer q1).

The R4 portion of the thus obtained Gas diffusion layer q1 corresponding to the first half, i.e. 15 cm, portion of the carbon paper at one end thereof, and the L4 portion of Gas diffusion q1 corresponding to the second half, i.e. remaining 15 cm, portion of the carbon paper at the other end thereof were measured with respect to its water permeability in terms of amount of permeability on the basis of the weighting method according to the example defined by JISZ0208, as already described in EXAMPLE II-1-1 above.

The amounts of permeability in the case of Gas diffusion layer q1, as measured, according to the above definition were 0.8×10$^4$ g/m$^2$·24 hr and 1.8×10$^4$ g/m$^2$·24 hr, respectively, with respect the R4 portion and the L4 portion. The amount of permeability at the R4 portion was thus found to be smaller than that at the L4 portion.

Meanwhile, a carbon powder having particle sizes of not more than 3 μm was immersed in an aqueous solution of chloroplatinic acid, and then the chloroplatinic acid was subjected to reduction process so as to allow the carbon particles to carry platinum catalyst on the surfaces thereof, with the weight ratio of the carbon powder to the platinum being 1:1. The thus prepared carbon powder was dispersed in an alcohol solution of a polymer electrolyte, thereby to make a slurry. The thus made slurry was uniformly coated, as a catalyst layer, on one surface of the electrically conductive polymer-containing layer of Gas diffusion layer q1, thereby to make a gas diffusion electrode (the thus made gas diffusion electrode being hereafter referred to as Gas diffusion electrode r1).

B. Production of Polymer Electrolyte Fuel Cell

Gas diffusion electrode r1 and Gas diffusion electrode j, as made in EXAMPLE II-1-1, having the same size as that of Gas diffusion electrode r1 were prepared. Further, a polymer electrolyte membrane (product of DuPont Company: Nafion 117) having an outer dimension one size larger than that of Gas diffusion electrodes j and r1 was prepared. The thus prepared polymer electrolyte membrane was sandwiched by Gas diffusion layers j and r1 in a manner that the respective catalyst layers faced the electrolyte membrane, and was provided with a silicone rubber gasket having a thickness of 250 μm positioned for gas sealing, and was then hot-pressed at 130° C. for 5 minutes, thereby to make an MEA.

The thus made MEA was sandwiched by a pair of separator plates to form a unit cell. By using additional MEAs and separator plates and alternately stacking them on the above made unit cell, a polymer electrolyte fuel cell according to the present EXAMPLE having a cell stack of four unit cells was made. Each of the separator plates, as used, had a thickness of 4 mm and was made of an airtight carbon material. Each of such separator plates had, on each surface thereof to contact the each gas diffusion layer, a gas flow channel having a width of 2 mm and a depth of 1 mm, which was formed by cutting the separator plate. The cell stack was provided with a metal end plate made of SUS 304 on each of the both ends thereof, and was fixed to be a polymer electrolyte fuel cell.

In making the fuel cell above, the R4 portion and the L4 portion were positioned to correspond to the inlet and outlet of the gas flow channel of each separator plate. Each gas flow channel, facing Gas diffusion electrode r1, of each separator plate was supplied with air to flow from the inlet to the outlet thereof at an oxygen utilization rate of 40%. Also, each gas flow channel, facing Gas diffusion electrode j, of each separator plate was supplied with hydrogen to flow from the inlet to the outlet thereof at a hydrogen utilization rate of 70%. Under such conditions, the polymer electrolyte fuel cell according to the present EXAMPLE was operated with a hydrogen humidifying bubbler, an air humidifying bubbler and the cell being maintained at temperatures of 85° C., 65° C. and 75° C., respectively. Consequently, the polymer electrolyte fuel cell according to the present EXAMPLE generated a voltage of 2.8 V, and maintained the initial voltage for 3,000 hours or more after the start of the cell operation, showing stable operation. The reason therefor is that the electrolyte membrane in the polymer electrolyte fuel cell according to the present EXAMPLE was kept at an appropriate wet condition, while excessive water generated therein was quickly and safely exhausted to outside of the cell.

Example II-3-2

A gas diffusion layer according to the present EXAMPLE (such gas diffusion layer being hereafter referred to as Gas diffusion layer q2) was made in the same manner as that employed for making Gas diffusion layer q1 according to EXAMPLE II-3-1 above, except that according to the present EXAMPLE, the N-methyl-2-pyrolidone solution as prepared in EXAMPLE II-3-1 for Dispersion p1 was substituted by an ethanol solution as follows.

According to the present EXAMPLE, the N-methyl-2-pyrolidone solution was substituted by an ethanol solution having a polyvinyl chloride dissolved therein, thereby to prepare a liquid dispersion having AB dispersed therein (the thus prepared liquid dispersion being hereafter referred to as Dispersion p2) in place of Dispersion p1, wherein the polyvinyl chloride, as used for Dispersion p2, had a coefficient of moisture permeability of 0.1 $g/m^2 \cdot hr \cdot mmHg$, and the weight ratio of the polyvinyl chloride to ethanol in the liquid dispersion of the polyvinyl chloride and ethanol here was 20:80.

Thereafter, in a manner similar to that described in EXAMPLE II-3-1, by mixing Dispersion e1 and Dispersion p2 in ten different mixing ratios in weight, ten different liquid dispersions were prepared, respectively having the ratios of Dispersion e1: Dispersion p2 of 9:1, 8:2, 7:3, 6:4, 5:5, 4:6, 3:7, 2:8, 1:9 and 0:10. Subsequently, a screen-printing process and a firing process at 350° C. were carried out in the same manner as in EXAMPLE II-3-1, thereby to make Gas diffusion layer q2.

The amounts of permeability in the case of Gas diffusion layer q2 were measured according to the weighting method of JISZ0208 as described above in EXAMPLE II-1-1 and other EXAMPLEs with respect to the R4 portion (first half portion) and the L4 portion (second half portion) thereof, which were found thereby to be $0.8 \times 10^4$ $g/m^2 \cdot 24$ hr and $2.3 \times 10^4$ $g/m^2 \cdot 24$ hr, respectively. In the words, the amount of permeability at the R4 portion according to the present EXAMPLE was the same as that in the case of EXAMPLE II-3-1 while that at the L3 portion according to the present EXAMPLE was larger than that in the case of EXAMPLE II-3-1. This is because the coefficient of moisture permeability at the R4 portion according to the present EXAMPLE was the same as that in the case of EXAMPLE II-3-1, while that at the L4 portion according to the present EXAMPLE was higher than that in the case of EXAMPLE II-3-1.

By using the thus made Gas diffusion layer q2, a gas diffusion electrode according to the present EXAMPLE (Gas diffusion electrode r2 hereafter) was made in the same manner as that employed for making Gas diffusion electrode r1 in EXAMPLE II-3-1. A polymer electrolyte fuel cell according to the present EXAMPLE was made by using Gas diffusion electrode r2 and Gas diffusion electrode j in the same manner as employed for making the polymer electrolyte fuel cell according to EXAMPLE II-3-1.

The characteristics of the polymer electrolyte fuel cell according to the present EXAMPLE were measured under the same conditions as used in EXAMPLE II-3-1. More specifically, the fuel cell according to the present EXAMPLE was operated under the same conditions as described above in EXAMPLE II-3-1 under the same arrangements that the R4 portion and the L4 portion were arranged to correspond to the inlet and the outlet of the gas flow channel, and that Gas diffusion electrode r2 and Gas diffusion electrode j were supplied with air and hydrogen, respectively.

Consequently, the polymer electrolyte fuel cell according to the present EXAMPLE generated a voltage of 2.8 V, and maintained the initial voltage for 3,000 hours or more after the start of the cell operation, showing stable operation. The reason therefor is that the electrolyte membrane in the polymer electrolyte fuel cell according to the present EXAMPLE was kept at an appropriate wet condition, while excessive water generated therein was quickly and safely exhausted to outside of the cell.

Example II-3-3

A gas diffusion layer according to the present EXAMPLE (such gas diffusion layer being hereafter referred to as Gas diffusion layer q3) was made in the same manner as that employed for making Gas diffusion layer q1 according to EXAMPLE II-3-1 above, except that according to the present EXAMPLE, the liquid dispersion D-1 of PTFE, as prepared in EXAMPLE II-3-1 for Dispersion e1 and containing the PTFE as a main ingredient, was substituted by an liquid dispersion of ethanol having polypropylene dispersed therein as follows.

According to the present EXAMPLE, the fluorocarbon resin solution was substituted by a liquid dispersion of ethanol having a polypropylene dispersed therein, thereby to prepare a liquid dispersion having AB dispersed therein (the thus prepared liquid dispersion being hereafter referred to as Dispersion e3) in place of Dispersion e1, wherein the polypropylene, as used for Dispersion e3, had a coefficient of moisture permeability of 0.01 $g/m^2 \cdot hr \cdot mmHg$, and the weight ratio of the polypropylene to ethanol in the liquid dispersion of the polypropylene and ethanol here was 20:80.

Thereafter, in a manner similar to that described in EXAMPLE II-3-1, by mixing Dispersion e3 and Dispersion p1 in ten different mixing ratios in weight, ten different liquid dispersions were prepared, respectively having the ratios of Dispersion e3: Dispersion p1 of 9:1, 8:2, 7:3, 6:4, 5:5, 4:6, 3:7, 2:8, 1:9 and 0:10. Subsequently, a screen-printing process and a firing process at 350° C. were carried out in the same manner as in EXAMPLE II-3-1, thereby to make Gas diffusion layer q3.

The amounts of permeability in the case of Gas diffusion layer q3 were measured according to the weighting method of JISZ0208 as described above in EXAMPLE II-1-1 and other EXAMPLEs with respect to the R4 portion (first half portion) and the L4 portion (second half portion) thereof, which were found thereby to be $0.8 \times 10^4$ $g/m^2 \cdot 24$ hr and $1.8 \times 10^4$ $g/m^2 \cdot 24$ hr, respectively. In the words, both the amounts of permeability at the R4 portion and the L4 portion according to the present EXAMPLE were the same as those, respectively, in the case of EXAMPLE II-3-1. This is because the coefficient of moisture permeability at the R4 portion and that at the L4 portion according to the present EXAMPLE were the same as those, respectively, in the case of EXAMPLE II-3-1, although the specific materials used in the present EXAMPLE were different from those used in EXAMPLE II-3-1.

By using the thus made Gas diffusion layer q3, a gas diffusion electrode according to the present EXAMPLE (Gas diffusion electrode r3 hereafter) was made in the same manner as that employed for making Gas diffusion electrode r1 in EXAMPLE II-3-1. A polymer electrolyte fuel cell according to the present EXAMPLE was made by using Gas diffusion electrode r3 and Gas diffusion electrode j in the same manner as employed for making the polymer electrolyte fuel cell according to EXAMPLE II-3-1.

The characteristics of the polymer electrolyte fuel cell according to the present EXAMPLE were measured under the same conditions as used in EXAMPLE II-3-1. More specifically, the fuel cell according to the present EXAMPLE was operated under the same conditions as described above in EXAMPLE II-3-1 under the same arrangements that the R4 portion and the L4 portion were arranged to correspond to the inlet and the outlet of the gas flow channel, and that Gas diffusion electrode r3 and Gas diffusion electrode j were supplied with air and hydrogen, respectively.

Consequently, the polymer electrolyte fuel cell according to the present EXAMPLE generated a voltage of 2.8 V, and maintained the initial voltage for 3,000 hours or more after the start of the cell operation, showing stable operation. The reason therefor is that the electrolyte membrane in the polymer electrolyte fuel cell according to the present EXAMPLE was kept at an appropriate wet condition, while excessive water generated therein was quickly and safely exhausted to outside of the cell.

Example II-3-4

A gas diffusion layer according to the present EXAMPLE (such gas diffusion layer being hereafter referred to as Gas diffusion layer q4) was made in the same manner as that employed for making Gas diffusion layer q1 according to EXAMPLE II-3-1 above, except that according to the present EXAMPLE, the liquid dispersion D-1 of PTFE, as prepared in EXAMPLE II-3-1 for Dispersion e1 and containing the PTFE as a main ingredient, was substituted by an liquid dispersion of ethanol having polypropylene dispersed therein, and that the N-methyl-2-pyrolidone solution as prepared in EXAMPLE II-3-1 for Dispersion p1 was substituted by an ethanol solution of a cellulose acetate, as follows.

According to the present EXAMPLE, the fluorocarbon resin solution was substituted by a liquid dispersion of ethanol having a polypropylene dispersed therein, thereby to prepare a liquid dispersion having AB dispersed therein (the thus prepared liquid dispersion being hereafter referred to as Dispersion e4) in place of Dispersion e1, wherein the polypropylene, as used for Dispersion e4, had a coefficient of moisture permeability of 0.01 g/m$^2$·hr·mmHg, and the weight ratio of the polypropylene to ethanol in the liquid dispersion of the polypropylene and ethanol here was 20:80.

Further, according to the present EXAMPLE, the N-methyl-2-pyrolidone solution was substituted by an ethanol solution having a cellulose acetate dissolved therein, thereby to prepare a liquid dispersion having AB dispersed therein (the thus prepared liquid dispersion being hereafter referred to as Dispersion p3) in place of Dispersion p1, wherein the cellulose acetate, as used for Dispersion p3, had a coefficient of moisture permeability of 0.1 g/m$^2$·hr·mmHg, and the weight ratio of the cellulose acetate to ethanol in the solution of the cellulose acetate and ethanol here was 20:80.

Thereafter, in a manner similar to that described in EXAMPLE II-3-1, by mixing Dispersion e4 and Dispersion p3 in ten different mixing ratios in weight, ten different liquid dispersions were prepared, respectively having the weight ratios of Dispersion e4: Dispersion p3 of 9:1, 8:2, 7:3, 6:4, 5:5, 4:6, 3:7, 2:8, 1:9 and 0:10. Subsequently, a screen-printing process and a firing process at 350° C. were carried out in the same manner as in EXAMPLE II-3-1, thereby to make Gas diffusion layer q4.

The amounts of permeability in the case of Gas diffusion layer q4 were measured according to the weighting method of JISZ0208 as described above in EXAMPLE II-1-1 and other EXAMPLEs with respect to the R4 portion (first half portion) and the L4 portion (second half portion) thereof, which were found thereby to be 0.8×10$^4$ g/m$^2$·24 hr and 2.3×10$^4$ g/m$^2$·24 hr, respectively. In the words, the amount of permeability at the R4 portion according to the present EXAMPLE was the same as that in each of cases of the three preceding EXAMPLEs, while the amount of permeability at the L4 portion according to the present EXAMPLE was the same as that in the case of EXAMPLE II-3-2. This is because the coefficient of moisture permeability at the R4 portion was the same as that in each of the cases of the three preceding EXAMPLEs, while that at the L4 portion according to the present EXAMPLE was the same as that in the case of EXAMPLE II-3-2, although the combination of specific materials used in the present EXAMPLE were different from those used in respective combinations of materials used in the three preceding EXAMPLEs.

By using the thus made Gas diffusion layer q4, a gas diffusion electrode according to the present EXAMPLE (Gas diffusion electrode r4 hereafter) was made in the same manner as that employed for making Gas diffusion electrode r1 in EXAMPLE II-3-1. A polymer electrolyte fuel cell according to the present EXAMPLE was made by using Gas diffusion electrode r4 and Gas diffusion electrode j in the same manner as employed for making the polymer electrolyte fuel cell according to EXAMPLE II-3-1.

The characteristics of the polymer electrolyte fuel cell according to the present EXAMPLE were measured under the same conditions as used in EXAMPLE II-3-1. More specifically, the fuel cell according to the present EXAMPLE was operated under the same conditions as described above in EXAMPLE II-3-1 under the same arrangements that the R4 portion and the L4 portion were arranged to correspond to the inlet and the outlet of the gas flow channel, and that Gas diffusion electrode r4 and Gas diffusion electrode j were supplied with air and hydrogen, respectively.

Consequently, the polymer electrolyte fuel cell according to the present EXAMPLE generated a voltage of 2.8 V, and maintained the initial voltage for 3,000 hours or more after the start of the cell operation, showing stable operation. The reason therefor is that the electrolyte membrane in the polymer electrolyte fuel cell according to the present EXAMPLE was kept at an appropriate wet condition, while excessive water generated therein was quickly and safely exhausted to outside of the cell.

It is to be noted that in the above four EXAMPLES II-3-1 to II-3-4, two kinds of materials having different coefficients of moisture permeability were used to be mixed, and drops of ten different mixing rations in weight were prepared and used. However, it was separately confirmed that the number of drops or number of different mixing ratios in weight could be other than ten, and also that the number of kinds of the materials having respectively different coefficients of moisture permeability could be three or more. More specifically, it was confirmed that when plural kinds of materials having different coefficient of moisture permeability were selected from among e.g. those having $0.8 \times 10^4$ g/m²·24 hr to $2.3 \times 10^4$ g/m²·24 hr in the case of the exemplified materials, and were mixed in plural mixtures so that the coefficient of moisture permeability increased, preferably gradually, from the R4 end portion to the L4 end portion, then operable results could be obtained as in the above four EXAMPLES II-3-1 to II-3-4.

COMPARATIVE EXAMPLE

For comparison, a polymer electrolyte fuel cell according to the present COMPARATIVE EXAMPLE was made in the same manner as that employed for making polymer electrolyte fuel cells according to each EXAMPLE of the Mode [II], except that according to the present COMPARATIVE EXAMPLE, the MEA was sandwiched by a pair of the same gas diffusion electrodes, each being Gas diffusion electrode j. More specifically, in each of the gas diffusion electrodes, that is Gas diffusion electrode j, the electrically conductive polymer-containing layer comprises: a single kind of carbon powder or carbon particles uniformly distributed throughout the surface of the gas diffusion layer; and a single kind of a polymer material uniformly distributed throughout the gas diffusion layer. Still more specifically describing, at both gas diffusion electrodes to sandwich the MEA therebetween according to the COMPARATIVE EXAMPLE, there is no variation of distribution or graduation with respect to either amount of acidic function group, degree of crystallinity or coefficient of moisture permeability.

The characteristics of the thus made polymer electrolyte fuel cell according to the present COMPARATIVE EXAMPLE were measured under the same conditions as used in each of the above EXAMPLEs of the Mode [II]. Consequently, the polymer electrolyte fuel cell according to the present COMPARATIVE EXAMPLE generated a voltage of 2.8 V as an initial voltage in the same manner as those of the above EXAMPLEs of the Mode [II], but the voltage gradually decreased, and became 1.8 V at a time point of 3,000 hours after the start of the cell operation, showing very unstable operation. The reason therefor is that the amount of water in the MEA of the polymer electrolyte fuel cell according to the present COMPARATIVE EXAMPLE was not sufficiently maintained at an appropriate wet condition, suffering from too little water or over dry of the polymer electrolyte membrane at the inlet side of the gas flow channel, and from a gas diffusion trouble, i.e. too much water or flooding, at the outlet side of the gas flow channel.

Although not demonstrated in the above EXAMPLEs of the Modes [I] and [II], further various polymer electrolyte fuel cells according to the present invention having the features of both the Modes [I] and [II] were made by combining one manner of making the polymer electrolyte fuel cell according to the present invention, variously selected from the EXAMPLEs of the Mode [I], with one manner of making the polymer electrolyte fuel cell according to the present invention variously selected from EXAMPLEs of the Mode [II]. It was confirmed by measuring the thus made polymer electrolyte fuel cells that each of such fuel cells had both the superior functions as obtained in each EXAMPLE of the Mode [I] and in each EXAMPLE of the Mode [II].

As evident from the foregoing, particularly from the Mode [I] according to the present invention, a good balance between water retention and water exhaustion in the thickness direction of each gas diffusion layer or gas diffusion electrode in a polymer electrolyte fuel cell can be obtained, with the supply of the reactive gases being sufficiently secured, thereby to improve the output performance of the fuel cell, when the pore distribution or the mesh distribution in the gas diffusion layer is uniquely designed.

Further, as evident from the foregoing, particularly from the Mode [II] according to the present invention, uniform water retention at the gas diffusion layer from an inlet side to an outlet side of each gas flow channel is realized. More specifically, in one of the following three manners (i), (ii) and (iii), the water permeating function at the surface of the gas diffusion layer can be adjusted, and the polymer electrolyte membrane of the MEA can be maintained at an appropriately wet condition, while generated excessive water can be quickly exhausted to outside thereof, whereby a fuel cell capable of stably operating for a long period can be realized:

(i) that in the electrically conductive polymer-containing layer of the gas diffusion layer, the polymer containing layer comprising a polymer material and electrically conductive carbon particles, the carbon particles comprise at least first carbon particles and second carbon particles that have a larger amount of acidic function group than that of the first carbon particles, wherein the weight ratio of the second carbon particles, relative to the first carbon particles, increases from one end of the gas diffusion layer, corresponding to an inlet of the gas flow channel, to the other end of the gas diffusion layer corresponding to an outlet of the gas flow channel;

(ii) that in the electrically conductive polymer-containing layer of the gas diffusion layer, the polymer-containing material comprising a polymer material and electrically conductive carbon particles, the polymer material comprises at least a first polymer material and a second polymer material that has a lower degree of crystallinity than that of the first polymer material, and wherein the weight ratio of the second polymer material, relative to the first polymer material, increases from one end of the gas diffusion layer, corresponding to an inlet of the gas flow channel, to the other end of the gas diffusion layer corresponding to an outlet of the gas flow channel; and (iii) that in the electrically conductive polymer-containing layer of the gas diffusion layer, the polymer-containing material comprising a polymer material and electrically conductive carbon particles, the polymer material comprises at least a first polymer material and a second polymer material that has a higher coefficient of moisture permeability than that of the first polymer material, and wherein the weight ratio of the second polymer material, relative to the first polymer material, increases from one end of the gas diffusion layer, corresponding to an inlet of the gas flow channel, to the other end of the gas diffusion layer corresponding to an outlet of the gas flow channel.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A polymer electrolyte fuel cell comprising: an ion conductive polymer electrolyte membrane; a pair of gas diffusion electrodes sandwiching said polymer electrolyte membrane therebetween, thereby forming a polymer electrolyte membrane-electrode assembly; and a pair of separator plates sandwiching therebetween said polymer electrolyte membrane-electrode assembly, and having gas flow channels facing respective ones of said pair of gas diffusion electrodes, each of said gas flow channels having an inlet and an outlet, wherein each of said pair of gas diffusion electrodes has a catalyst layer in contact with said polymer electrolyte membrane and a gas diffusion layer in contact with a respective catalyst layer, wherein each of said gas diffusion layers comprises a porous carbon supporting body, wherein each of said porous carbon supporting bodies comprises at least a first porous carbon layer and a second porous carbon layer, said first porous carbon layer facing a corresponding one of said catalyst layers, and wherein said first porous carbon layer has a larger number of smaller pores distributed therein as compared with said second porous carbon layer, said second porous carbon layer having a smaller number of larger pores distributed therein as compared with said first porous carbon layer, wherein each of said pair of gas diffusion layers comprises an electrically conductive polymer-containing layer provided thereon at a catalyst layer side thereof, wherein said electrically conductive polymer-containing layer comprises a polymer material and electrically conductive carbon particles, wherein in at least one of said electrically conductive polymer-containing layers comprising said polymer material and said electrically conductive carbon particles, said electrically conductive carbon particles comprise first carbon particles and second carbon particles having a larger amount of acidic functional groups than that of said first carbon particles, and wherein the weight ratio of said second carbon particles, relative to said first carbon particles, increases from one end of said gas diffusion layer, corresponding to said inlet of said gas flow channel, to the other end of said gas diffusion layer corresponding to said outlet of the gas flow channel.

2. The polymer electrolyte fuel cell according to claim 1, wherein each of said porous carbon supporting bodies comprises a carbon cloth.

3. The polymer electrolyte fuel cell according to claim 1, wherein said first and said second porous carbon layers comprise a first carbon cloth and a second carbon cloth, respectively, said first carbon cloth having a finer mesh than that of said second carbon cloth.

4. The polymer electrolyte fuel cell according to claim 1, wherein said first and said second porous carbon layers each comprise a first layer of wefts and a second layer of wefts, respectively, said first layer of wefts and said second layer of wefts being woven by common warps in a manner such that said first layer of wefts has a shorter average inter-weft distance than that of said second layer of wefts.

5. The polymer electrolyte fuel cell according to claim 1, wherein said first and said second porous carbon layers each comprise a first carbon cloth and a second carbon cloth which are made of first threads and second threads, respectively, said first threads having an average diameter smaller than that of said second threads, thereby allowing said first carbon cloth to have a finer mesh than that of said second carbon cloth.

6. The polymer electrolyte fuel cell according to claim 1, wherein said first porous carbon layer comprises an unwoven carbon fabric, and said second porous layer comprises a carbon cloth.

7. The polymer electrolyte fuel cell according to claim 1, wherein said polymer material of each of said electrically conductive polymer-containing layers contains a fluorocarbon resin.

8. The polymer electrolyte fuel cell according to claim 1, wherein each of said porous carbon supporting bodies has a water repellent property.

9. A polymer electrolyte fuel cell comprising: an ion conductive polymer electrolyte membrane; a pair of gas diffusion electrodes sandwiching said polymer electrolyte membrane therebetween, thereby forming a polymer electrolyte membrane-electrode assembly; and a pair of separator plates sandwiching therebetween said polymer electrolyte membrane-electrode assembly, and having gas flow channels facing respective ones of said pair of gas diffusion electrodes, each of said gas flow channels having an inlet and an outlet, wherein each of said pair of gas diffusion electrodes has a catalyst layer in contact with said polymer electrolyte membrane and a gas diffusion layer in contact with a respective catalyst layer, wherein each of said gas diffusion layers comprises a porous carbon supporting body, wherein each of said porous carbon supporting bodies comprises at least a first porous carbon layer and a second porous carbon layer, said first porous carbon layer facing a corresponding one of said catalyst layers, and wherein said first porous carbon layer has a larger number of smaller pores distributed therein as compared with said second porous carbon layer, said second porous carbon layer having a smaller number of larger pores distributed therein as compared with said first porous carbon layer, wherein each of said pair of gas diffusion layers comprises an electrically conductive polymer-containing layer provided thereon at a catalyst layer side thereof, wherein said electrically conductive polymer-containing layer comprises a polymer material and electrically conductive carbon particles, wherein in at least one of said electrically conductive polymer-containing layers comprising said electrically conductive carbon particles and said polymer material, said polymer material comprises a first polymer material and a second polymer material having a lower degree of crystallinity than that of said first polymer material, and wherein the weight ratio of said second polymer material, relative to said first polymer material, increases from one end of said gas diffusion layer, corresponding to said inlet of said gas flow channel, to the other end of said gas diffusion layer corresponding to said outlet of said gas flow channel.

10. A polymer electrolyte fuel cell comprising: an ion conductive polymer electrolyte membrane; a pair of gas diffusion electrodes sandwiching said polymer electrolyte membrane therebetween, thereby forming a polymer electrolyte membrane-electrode assembly; and a pair of separator plates sandwiching therebetween said polymer electrolyte membrane-electrode assembly, and having gas flow channels facing respective ones of said pair of gas diffusion electrodes, each of said gas flow channels having an inlet and an outlet, wherein each of said pair of gas diffusion electrodes has a catalyst layer in contact with said polymer electrolyte membrane and a gas diffusion layer in contact with a respective catalyst layer, wherein each of said gas diffusion layers comprises a porous carbon supporting body, wherein each of said porous carbon supporting bodies comprises at least a first porous carbon layer and a second porous carbon layer, said first porous carbon layer facing a corresponding one of said catalyst layers, and wherein said first porous carbon layer has a larger number of smaller pores distributed therein as compared with said second porous carbon layer, said second porous carbon layer having a smaller number of larger pores distributed therein as compared with said first porous carbon layer, wherein each of said pair of gas diffusion layers comprises an electrically conductive polymer-containing layer provided thereon at a catalyst layer side thereof, wherein said electrically conductive polymer-containing layer comprises a polymer material and electrically conductive carbon particles, wherein in at least one of said electrically conductive polymer-containing layers comprising said electrically conductive carbon particles and said polymer material, said polymer material comprises at least a first polymer material and a second polymer material having a higher coefficient of moisture permeability than that of said first polymer, and wherein the weight ratio of said second polymer material, relative to said first polymer material, increases from one end of said gas diffusion layer, corresponding to said inlet of said gas flow channel, to the other end of said gas diffusion layer corresponding to said outlet of said gas flow channel.

* * * * *